United States Patent
Tiliks et al.

(10) Patent No.: US 8,155,293 B2
(45) Date of Patent: *Apr. 10, 2012

(54) SYSTEM AND METHOD FOR RESTRICTING AND MONITORING TELEPHONE CALLS

(75) Inventors: Dianna Inara Tiliks, Elk Grove, IL (US); Susanne Marie Crockett, Buffalo Grove, IL (US); Nancy Ann Book, Naperville, IL (US); Carol Shifrin Gruchala, Naperville, IL (US); John Wesley Moss, Lake Zurich, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/178,710

(22) Filed: Jul. 24, 2008

(65) Prior Publication Data

US 2008/0279359 A1 Nov. 13, 2008

Related U.S. Application Data

(63) Continuation of application No. 11/555,310, filed on Nov. 1, 2006, now Pat. No. 7,418,089, which is a continuation of application No. 09/983,303, filed on Oct. 24, 2001, now Pat. No. 7,155,001.

(51) Int. Cl.
*H04M 3/00* (2006.01)

(52) U.S. Cl. ......... 379/196; 379/197; 379/198; 379/200

(58) Field of Classification Search .................. 379/196, 379/197, 198, 200
See application file for complete search history.

(56) References Cited

U.S. PATENT DOCUMENTS

| | | | |
|---|---|---|---|
| 4,232,199 A | 11/1980 | Boatwright et al. |
| 4,266,098 A | 5/1981 | Novak |
| 4,296,463 A | 10/1981 | Dalboussiere et al. |
| 4,429,188 A | 1/1984 | Allen |
| 4,611,094 A | 9/1986 | Asmuth et al. |
| 4,611,096 A | 9/1986 | Asmuth et al. |
| 4,788,718 A | 11/1988 | McNabb |
| 4,860,347 A | 8/1989 | Costello |
| 4,899,373 A | 2/1990 | Lee et al. |
| 5,054,055 A | 10/1991 | Hanle et al. |
| 5,109,408 A | 4/1992 | Greenspan et al. |
| 5,200,995 A | 4/1993 | Gaukkel et al. |

(Continued)

FOREIGN PATENT DOCUMENTS

EP 0611083 8/1994

(Continued)

OTHER PUBLICATIONS

Berman, Roger K., and Brewster, John H., "Perspectives on the AIN Architecture," IEEE Communications Magazine, pp. 27-32 (Feb. 1992).

(Continued)

*Primary Examiner* — Quynh Nguyen

(74) *Attorney, Agent, or Firm* — Greenblum & Bernstein, P.L.C.

(57) ABSTRACT

Communications from a first communications address identified by a service user are controlled. Data of a communication from the first communications address to a third party communications address is received. The communication is disallowed when an identification number received from a party requesting the communication is not a personal identification number specified by the service user, the first communications address is a restricted address for which the service user has elected to disallow communications, and the third party communications address is not a priority communications address for which the service user has elected to allow communications.

20 Claims, 13 Drawing Sheets

U.S. PATENT DOCUMENTS

| | | |
|---|---|---|
| 5,241,588 A | 8/1993 | Babson, III et al. |
| 5,247,571 A | 9/1993 | Kay et al. |
| 5,294,229 A | 3/1994 | Hartzell et al. |
| 5,333,185 A | 7/1994 | Burke et al. |
| 5,337,351 A | 8/1994 | Manabe et al. |
| 5,345,380 A | 9/1994 | Babson, III et al. |
| 5,353,331 A | 10/1994 | Emery et al. |
| 5,398,220 A | 3/1995 | Barker |
| 5,404,396 A | 4/1995 | Brennan |
| 5,436,957 A | 7/1995 | McConnell |
| 5,438,568 A | 8/1995 | Weisser, Jr. |
| 5,444,768 A | 8/1995 | Lemaire et al. |
| 5,448,631 A | 9/1995 | Cain |
| 5,467,388 A | 11/1995 | Redd, Jr. et al. |
| 5,479,487 A | 12/1995 | Hammond |
| 5,533,102 A | 7/1996 | Robinson et al. |
| 5,548,566 A | 8/1996 | Barker |
| 5,550,909 A | 8/1996 | Chanda et al. |
| 5,572,583 A | 11/1996 | Wheeler, Jr. et al. |
| 5,579,384 A | 11/1996 | Seymour |
| 5,583,564 A | 12/1996 | Rao et al. |
| 5,592,541 A | 1/1997 | Fleischer, III et al. |
| 5,615,252 A | 3/1997 | Sizer, II et al. |
| 5,625,676 A | 4/1997 | Greco et al. |
| 5,629,978 A | 5/1997 | Blumhardt et al. |
| 5,642,410 A | 6/1997 | Walsh et al. |
| 5,655,013 A | 8/1997 | Gainsboro |
| 5,657,451 A | 8/1997 | Khello |
| 5,680,446 A | 10/1997 | Fleischer, III et al. |
| 5,687,212 A | 11/1997 | Kinser, Jr. et al. |
| 5,696,815 A | 12/1997 | Smyk |
| 5,740,438 A | 4/1998 | Ratcliff et al. |
| 5,742,668 A | 4/1998 | Pepe et al. |
| 5,751,707 A | 5/1998 | Voit et al. |
| 5,754,636 A | 5/1998 | Bayless et al. |
| 5,758,351 A | 5/1998 | Gibson et al. |
| 5,764,748 A | 6/1998 | Rosenthal et al. |
| 5,787,237 A | 7/1998 | Reilly |
| 5,790,173 A | 8/1998 | Strauss et al. |
| 5,796,806 A | 8/1998 | Birckbichler |
| 5,796,950 A | 8/1998 | Sips et al. |
| 5,799,073 A | 8/1998 | Fleischer, III et al. |
| 5,802,157 A | 9/1998 | Clarke et al. |
| 5,802,159 A | 9/1998 | Smolentzov et al. |
| 5,805,587 A | 9/1998 | Norris et al. |
| 5,822,419 A | 10/1998 | Enstone et al. |
| 5,844,978 A | 12/1998 | Reuss et al. |
| 5,864,613 A | 1/1999 | Flood |
| 5,867,562 A | 2/1999 | Scherer |
| 5,870,549 A | 2/1999 | Bono, II |
| 5,881,144 A | 3/1999 | Havens |
| 5,892,822 A | 4/1999 | Gottlieb et al. |
| 5,915,008 A | 6/1999 | Dulman |
| 5,917,817 A | 6/1999 | Dunn et al. |
| 5,920,618 A | 7/1999 | Fleischer, III et al. |
| 5,933,490 A | 8/1999 | White et al. |
| 5,933,778 A | 8/1999 | Buhrmann et al. |
| 5,937,050 A | 8/1999 | Yue et al. |
| 5,940,488 A | 8/1999 | DeGrazia et al. |
| 5,946,381 A | 8/1999 | Danne et al. |
| 5,958,016 A | 9/1999 | Chang et al. |
| 5,982,774 A | 11/1999 | Foladare et al. |
| 5,982,870 A | 11/1999 | Pershan et al. |
| 5,999,611 A | 12/1999 | Tatchell et al. |
| 6,028,917 A | 2/2000 | Creamer et al. |
| 6,032,184 A | 2/2000 | Cogger et al. |
| 6,038,296 A | 3/2000 | Brunson et al. |
| 6,058,175 A | 5/2000 | Schultz |
| 6,058,178 A | 5/2000 | McKendry et al. |
| 6,091,808 A | 7/2000 | Wood et al. |
| 6,097,802 A | 8/2000 | Fleischer, III et al. |
| 6,104,799 A | 8/2000 | Jain et al. |
| 6,115,040 A | 9/2000 | Bladow et al. |
| 6,118,780 A | 9/2000 | Dunn et al. |
| 6,125,126 A | 9/2000 | Hallenstal et al. |
| 6,134,310 A | 10/2000 | Swan et al. |
| 6,160,877 A | 12/2000 | Tatchell et al. |
| 6,161,128 A | 12/2000 | Smyk |
| 6,167,122 A | 12/2000 | Titmuss et al. |
| 6,173,437 B1 | 1/2001 | Polcyn |
| 6,192,118 B1 | 2/2001 | Bayless et al. |
| 6,195,678 B1 | 2/2001 | Komuro |
| 6,195,697 B1 | 2/2001 | Bowman-Amuah |
| 6,212,561 B1 | 4/2001 | Sitaraman et al. |
| 6,233,330 B1 | 5/2001 | McClure et al. |
| 6,240,441 B1 | 5/2001 | Beckett et al. |
| 6,246,751 B1 | 6/2001 | Bergl et al. |
| 6,246,756 B1 | 6/2001 | Borland et al. |
| 6,259,449 B1 | 7/2001 | Saxena et al. |
| 6,263,064 B1 | 7/2001 | O'Neal et al. |
| 6,317,484 B1 | 11/2001 | McAllister |
| 6,320,948 B1 | 11/2001 | Heilmann et al. |
| 6,330,598 B1 | 12/2001 | Beckwith et al. |
| 6,337,899 B1 | 1/2002 | Alcendor et al. |
| 6,445,694 B1 | 9/2002 | Swartz |
| 6,456,706 B1 | 9/2002 | Blood et al. |
| 6,463,145 B1 | 10/2002 | O'Neal et al. |
| 6,529,596 B1 | 3/2003 | Asprey et al. |
| 6,549,619 B1 | 4/2003 | Bell et al. |
| 6,574,661 B1 | 6/2003 | Delano et al. |
| 6,631,186 B1 | 10/2003 | Bendinelli et al. |
| 6,631,416 B2 | 10/2003 | Bendinelli et al. |
| 6,640,239 B1 | 10/2003 | Gidwani |
| 6,647,106 B1 | 11/2003 | Hussain et al. |
| 6,662,221 B1 | 12/2003 | Gonda et al. |
| 6,678,827 B1 | 1/2004 | Rothermel et al. |
| 6,748,439 B1 | 6/2004 | Monachello et al. |
| 6,778,651 B1 | 8/2004 | Jost et al. |
| 6,816,481 B1 | 11/2004 | Adams et al. |
| 6,891,940 B1 | 5/2005 | Bhandaru et al. |
| 7,167,550 B2 | 1/2007 | Klos et al. |
| 2001/0048738 A1 | 12/2001 | Baniak et al. |
| 2001/0049737 A1 | 12/2001 | Carolan et al. |
| 2002/0054587 A1 | 5/2002 | Baker et al. |
| 2002/0168055 A1 | 11/2002 | Crockett et al. |
| 2003/0007621 A1 | 1/2003 | Graves et al. |
| 2003/0079028 A1 | 4/2003 | Kortum et al. |
| 2003/0161459 A1 | 8/2003 | McBlain et al. |
| 2003/0200321 A1 | 10/2003 | Chen et al. |
| 2004/0199624 A1 | 10/2004 | Poisson et al. |
| 2004/0213392 A1 | 10/2004 | Crockett et al. |
| 2004/0243708 A1 | 12/2004 | Stebbings |
| 2005/0058270 A1 | 3/2005 | Allen et al. |
| 2005/0114794 A1 | 5/2005 | Grimes et al. |

FOREIGN PATENT DOCUMENTS

| | | |
|---|---|---|
| EP | 0740480 | 10/1996 |
| WO | 92/09164 | 5/1992 |
| WO | 99/16230 | 4/1999 |
| WO | 99/20058 | 4/1999 |
| WO | 00/65857 | 11/2000 |
| WO | 01/35240 | 5/2001 |

OTHER PUBLICATIONS

Advanced Intelligent Network (AIN) 0.1 Switching Systems Generic Requirements (Bellcore TR-NWT-001284), Issue 1 (Aug. 1992).

Advanced Intelligent Network (AIN) 0.1 Switch-Service Control Point (SCP) Application Protocol Interface Generic Requirements (Bellcore TR-NWT-001285), Issue 1 (Aug. 1992).

"MegaHub PACE SMS-Service Management System— Advanced Intelligent Network Systems," Communications Corporation, Issue 0.4, (Jul. 1994).

BT Technology Journal, vol. 13, No. 2, pp. 132-142, Marshall et al., "The information services supermarket" (Apr. 1995).

Internet web pages by Dazil Internet Services, "Caller EyeDee," (Dec. 2001).

Internet Web Pages by Z-Tel, "Personal Communications Center", (Apr. 2000 and May 2000).

Internet Web Pages by TOSC International, "Cool Call", (May 2000).

Internet Web Pages by Phone.Com, "My Phone Services", (May 2000).

Lennox et al., "Call processing Language Framework and Requirements", RFC 2824, (May 2000).

Lennox et al., "CPL: A Language for User Control of Internet Telephony Services", Internet Engineering Task Force, IPTEL WG, (Oct. 2000).

Rosenberg, "Introduction to CPL", Dynamicsoft, Winter 2001 Von Developers Conference, (Feb. 2001).

"Next Generation Phone System", downloaded from CommWeb.com, (Aug. 2001).

"Teleglobe International Toll Free Services", downloaded from teleglobe.com. (Dec. 2002).

"Sprint Wholesale Toll-Free Services," downloaded from sprintbiz.com/wholesale/products/toll_free_services.pdf (Jan. 2001).

Kramer, "Standalone Call Accounting: The Hardware, The Software and The Enterprise", Communications Convergence, downloaded from cconvergence.com (Mar. 2001).

SYSTEM AND METHOD FOR RESTRICTING AND MONITORING TELEPHONE CALLS

CROSS REFERENCE TO RELATED APPLICATION

This application is a continuation of pending U.S. patent application Ser. No. 11/555,310, filed Nov. 1, 2006, which is a continuation of U.S. patent application Ser. No. 09/983,303, filed on Oct. 24, 2001, issued as U.S. Pat. No. 7,155,001, the disclosures of which are expressly incorporated herein by reference in their entireties.

This application is related to U.S. patent application Ser. No. 09/716,276 to Gorden BLUMENSCHEIN, et al., filed on Nov. 21, 2000, issued as U.S. Pat. No. 6,631,186, the disclosure of which is expressly incorporated herein by reference in its entirety.

BACKGROUND OF THE INVENTION

1. Field of the Invention

The present invention relates to the field of telecommunications. More particularly, the present invention relates optimizing the deigns of trunk networks in the public switched telephone network by routing based on analysis of congested switches.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Central Exchange Service (Centrex)
Central Office (CO)
Dual Tone Multi-Frequency (DTMF)
Graphical User Interface (GUI)
HyperText Mark-Up Language (HTML)
HyperText Transfer Language Protocol (HTTP)
Interactive Voice Response (IVR)
Line Information Database (LIDB)
Numbering Plan Area (NPA)
Outgoing Call Control (OCC)
Personal Computer (PC)
Personal Call Manager/Personal Communications Manager (PCM)
Personal Identification Number (PIN)
Private Branch Exchange (PBX)
Public Switched Telephone Network (PSTN)
Service Control Point (SCP)
Service Management System (SMS)
Service Switching Point (SSP)
Signaling System 7 (SS7)
Signaling Transfer Point (STP)
Terminating Attempt Trigger (TAT)
Transaction Capabilities Application Part (TCAP)
Transmission Control Protocol/Internet Protocol (TCP/IP)
World Wide Web (WWW)

3. Background Information

Telephones have become a practical necessity in today's society, from both personal and professional perspectives. Telephone calls exchanged in the course of daily activities assist in enabling the convenience and efficiency of modern living. However, telephone calls likewise may become disruptive to families and businesses alike, when they are excessive, poorly timed or inappropriate. Often, the disruptive telephone calls are being made to or initiated by a relatively small group.

Consequently, various telephone services have been developed to enable customers to prevent selected incoming and outgoing telephone calls from connecting through the public switched telephone network (PSTN). Incoming calls may be blocked based on selected time periods or on the calling telephone number. For example, if a family wishes not to be disturbed at dinner time, the subscriber initiates an incoming call blocking service, e.g. depressing a predetermined sequence of keys of a dual tone multi-frequency (DTMF) telephone, to avoid receiving all incoming calls from 5:30 p.m. to 7:00 p.m. Similarly, a business that conducts a daily staff meeting from 8:00 a.m. to 9:00 a.m. redirects all incoming calls to an answering service. Likewise, conventional services enable subscribers to block calls from selected telephone numbers, e.g., telemarketers, to avoid harassment or interruptions.

Outgoing calls may similarly be blocked based on selected time periods or on called telephone numbers. Conventionally, outgoing calls are blocked during certain hours selected by the subscriber. For example, calls from a teenager's telephone can be blocked from 9:00 p.m. to 7:00 a.m. the following day in order to prevent excessive nightly use of the telephone and to encourage the teenager to do homework or go to bed. Further, a typical application of controlling outgoing calls based on telephone numbers is blocking calls to "900" numbers from the subscriber's business or home, avoiding potentially inappropriate communications and undesirable bills. Also, conventional services typically enable blocking of all long distance calls initiated from the subscriber's telephone.

Current telecommunications services include several drawbacks. One is that call blocking may negatively affect the subscriber by preventing completion of important calls to and from the subscriber's telephone number. For example, a service that merely blocks all incoming calls to the subscriber's home during a preselected time period each day, or originating from a particular area code, may inadvertently prevent the subscriber from calling his own home. Similarly, the subscriber is unable to complete a telephone call from his own home during a restricted period, or to a restricted number, without first deactivating the call blocking feature. The unblocking process is time consuming and, in an emergency situation, potentially disastrous.

Another disadvantage is that the subscriber does not know what and when telephone calls are blocked, unless the subscriber also subscribes to (and activates) a separate service, e.g., caller identification, automated voice messaging, etc., that captures the information. Further, conventional call blocking systems do not provide instantaneous (or nearly instantaneous) call blocking data from the PSTN to the customer.

In addition, there is no convenient way to interactively access call blocking services, e.g., accessing records of blocked calls, activating schedules, activating restricted number lists, and the like, that is consistently and reliably available to the customer, regardless of the customer's circumstances and location. For example, conventional call blocking services are generally accessible to the customer either using a DTMF telephone through an interactive voice response (IVR) system in the PSTN or using a graphical user interface (GUI) over the Internet. The IVR communication is often more convenient due to the common accessibility of DTMF telephones. For example, to initiate call blocking, the customer simply goes off-hook at a DTMF subject telephone, dials the service provider number and follows the voice generated instructions to activate the call blocking. However, IVR interaction is time consuming and often tedious and undesirable from the subscriber's point of view. The Internet communication is therefore preferable under many circumstances, because service related data is provided quickly and in easily comprehensible visual (as opposed to audio) formats. However, Internet communications require an Internet accessible device, such as a personal computer or a personal digital assistant (PDA). Internet accessible devices are significantly more expensive than DTMF telephones and less readily accessible.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
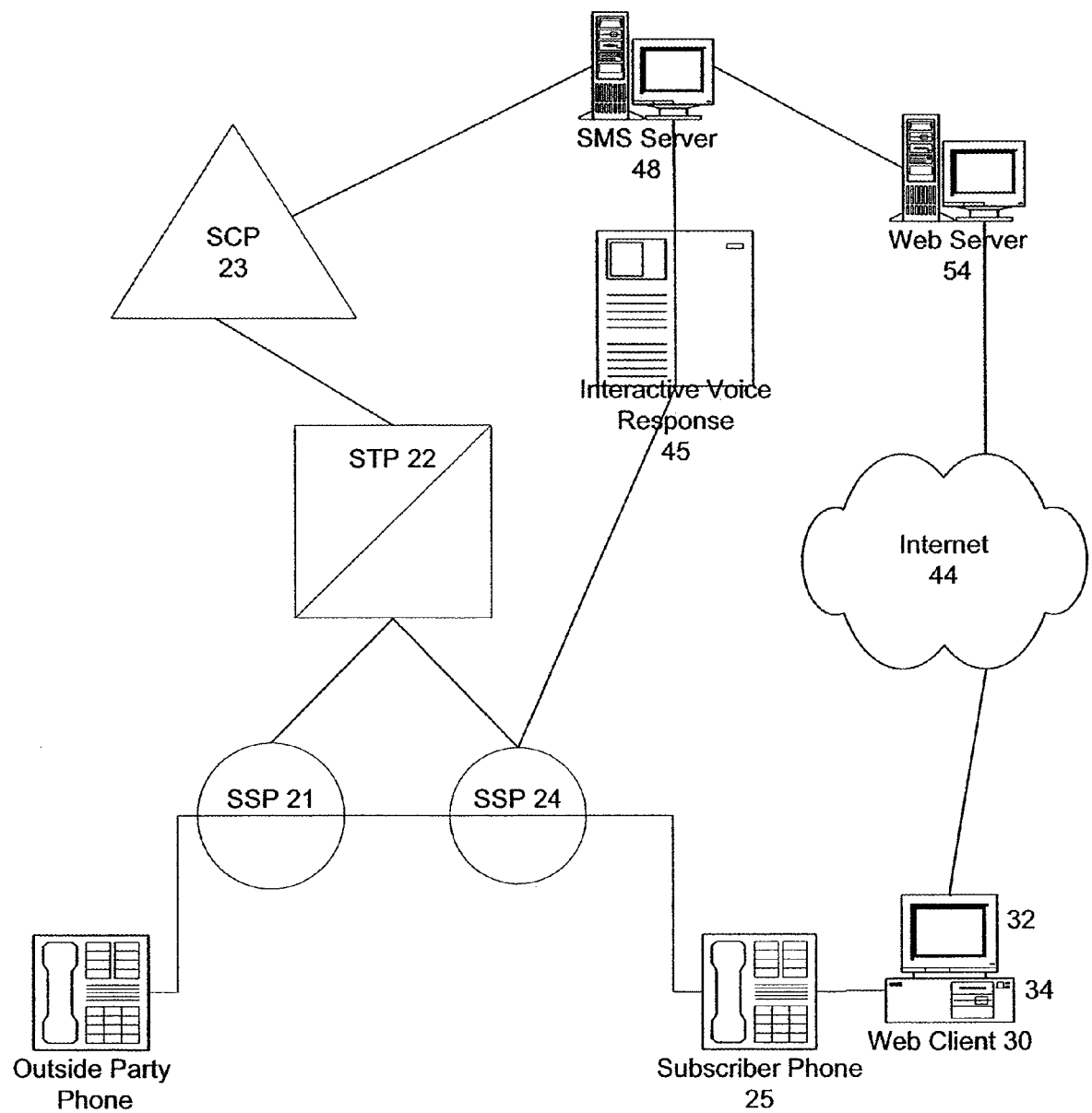
FIG. 1 is a block diagram showing an exemplary telecommunications network for the call monitoring service, according to an aspect of the present invention.

The present invention relates a call monitoring service that is an AIN based system and method that set restrictions on incoming and outgoing telephone calls for a service subscriber based, for example, on time of day, day of week scheduling. Personal identification numbers are provided to enable the calling party or the called party to override existing restrictions on the incoming and outgoing calls, respectively, based on previously provided instructions from the subscriber. Further, the service enables the subscriber, when connected to a communications network, including the Internet and other packet switched type data networks, or to a conventional IVR system, to customize aspects of the call monitoring service, with near real-time access to the service data. For example, the invention relates to providing call detail records, in near real time, that can be downloaded from a web-site related to the call monitoring service. The web site also provides a tool for implementing and editing the various restrictions, including for example, lists of restricted and priority telephone numbers, as well as activation/deactivation schedules.

The call monitoring service may be implemented individually or through a Personal Call Manager (PCM) system, disclosed in U.S. patent application Ser. No. 09/619,312 to Anil Kumar BHANDARI et al., filed on Jul. 19, 2000, the disclosure of which is expressly incorporated by reference herein in its entirety, along with other telecommunication services, such as personal directories, Internet Caller Identification (ICID), Incoming Call Manager (ICM) and Outgoing Call Control (OCC) and Flexible Call Forwarding (FCF), disclosed in U.S. patent application Ser. No. 09/716,276 to Gorden BLUMENSCHEN, et al., filed on Nov. 21, 2000, the disclosure of which is expressly incorporated by reference herein in its entirety.

In view of the above, the present invention through one or more of its various aspects and/or embodiments is presented to accomplish one or more objectives and advantages, such as those noted below.

An aspect of the present invention provides a method for selectively controlling and monitoring telephone calls in a telecommunications network with respect to a telephone number associated with a subscriber terminal. The method includes storing at least one restricted telephone number and a personal identification number associated with the subscriber, receiving at a service control point call data relating to a call involving the subscriber telephone number and an outside telephone number, and determining at the service control point whether the outside telephone number matches the at least one restricted telephone number. The call data includes the subscriber telephone number and the outside telephone number. When the outside telephone number does not match the at least one restricted telephone number, the call is connected between the subscriber telephone number and the outside telephone number. When the outside telephone number matches the at least one restricted telephone number, the call data is stored and entry of the personal identification number is requested.

The stored call data is transmitted to a service management system that is accessible by the subscriber via a graphical user interface through a packet switched data network. The service management system may also be accessible by the subscriber via an interactive voice response system through the telecommunications network. The call data may be displayed in near real-time on the graphical user interface.

An identification number is received at the service control point in response to the request for the personal identification number and the service control point determines whether the identification number is the personal identification number. When the identification number is not the personal identification number, the call is terminated. When the identification number is the personal identification number, the call is connected between the subscriber telephone number and the outside telephone number.

The method for selectively controlling and monitoring telephone calls may further include storing at least one time period, including a start time and an associated stop time, and determining at the service control point whether a time of the call is within the at least one time period. When the time of the call is not within the at least one time period, the call is connected regardless of whether the outside telephone number matches the at least one restricted telephone number. When the time of the call is within the at least one time period, it is determined whether the outside telephone number matches the at least one restricted telephone number.

The method may further include storing at least one priority telephone number. When the outside telephone number matches the at least one restricted telephone number, the service control point determines whether the outside telephone number also matches the at least one priority telephone number. When the outside telephone number does not match the at least one priority telephone number, the call is terminated. When the outside telephone number matches the at least one priority telephone number, the call is connected between the subscriber telephone number and the outside telephone number.

Another aspect of the invention provides a method for selectively controlling and monitoring telephone calls in a telecommunications network with respect to a telephone number associated with a subscriber terminal and includes storing at a service control point multiple call control schedules, each of which includes at least one activation period and at least one restricted telephone number corresponding to the at least one activation period. An instruction is received at the service control point from a service management system to implement at least one of the call control schedules, the service management system being accessible by the subscriber via a graphical user interface through a packet switched data network and an interactive voice response system through the telecommunications network. The service control point receives call data relating to a call involving the subscriber telephone number and an outside telephone number, the call data including the subscriber telephone number and the outside telephone number. The service control point determines whether the call occurs within the at least one activation period of the at least one call control schedule. When the call does occur within the at least one activation period of the at least one call control schedule, the service control point determines whether the outside telephone number is the at least one restricted telephone number of the at least one call control schedule. When the outside telephone number is a restricted telephone number, the call is terminated and the call data is stored at the service control point. The method may also include transmitting to the service management system the stored call data, substantially simultaneously with storing the call data. Also, the call data may be displayed at the graphical user interface substantially simultaneously with transmitting the call data to the service management system.

A personal identification number associated with the subscriber may also be stored at the service control point. When the outside telephone number is a restricted telephone number, entry of the personal identification number is requested. An identification number is received at the service control point in response to the request for the personal identification number and the service control point determines whether the identification number is the personal identification number. When the identification number is not the personal identification number, the call is terminated. When the identification number is the personal identification number, the call is connected between the subscriber telephone number and the outside telephone number.

The method may further include storing at least one priority telephone number. When the outside telephone number is a restricted telephone number, the service control point further determines whether the outside telephone number is among the at least one priority telephone number. When the outside telephone number is not a priority telephone number, the call is terminated. When the outside telephone number is a priority telephone number, the call is connected between the subscriber telephone number and the outside telephone number.

Another aspect of the invention provides a system for selectively controlling and monitoring telephone calls with respect to a telephone number associated with a subscriber terminal. The system includes a service control point in a public switched telephone network, which receives call data relating to a call involving the subscriber telephone number and an outside telephone number, and a service management system, connectable to the service control point and accessible by the subscriber via a graphical user interface through a packet switched data network. The service control point receives a personal identification number associated with the subscriber from the service management system. The call data includes the subscriber telephone number and the outside telephone number. The service control point determines whether the outside telephone number is restricted, based on previously stored restricted telephone number data identified by the subscriber. When the outside telephone number is not restricted, the service control point completes the call, and when the outside telephone number is restricted, the service control point controls playing an announcement requesting entry of the personal identification number. The service control point further determines whether an identification number entered in response to the announcement is the personal identification number. When the entered identification number is the personal identification number, the call is completed regardless of whether the outside telephone number is restricted, and when the entered identification number is not the personal identification number, the call is terminated.

Furthermore, when the service control point determines that the outside telephone number is restricted, the service control point may store the call data and transmit the call data to the service management system. The service control point transmits the call data to the service management system substantially simultaneously with determining that the outside telephone number is restricted. The service management system transmits the call data to the graphical user interface for display substantially simultaneously with a request for the call data through the graphical user interface.

Yet another aspect of the invention provides a system for selectively controlling and monitoring incoming and outgoing telephone calls with respect to a telephone number associated with a subscriber terminal. The system includes multiple switches and a service control point in a public switched telephone network. The service control point stores at least one restricted telephone number and at least one personal identification number. The service control point receives one of incoming call data and outgoing call data from one of the switches relating to a call that includes the subscriber telephone number. The incoming call data and outgoing call data includes the subscriber telephone number and an outside party telephone number. The system also includes a service management system, connectable to the service control point and accessible by the subscriber via a graphical user interface through a packet switched data network and an interactive voice response system through the public switched telephone network.

The service control point determines whether the outside party telephone number matches the at least one restricted telephone number. When the outside party telephone number does not match the at least one restricted telephone number, the service control point instructs the switch to connect the call between the subscriber terminal and an outside party terminal associated with the outside party telephone number. When the calling party telephone number matches the at least one restricted telephone number, the service control point instructs the switch to play an announcement requesting entry of an identification number. The service control point receives from the switch the identification number and compares the identification number to the personal identification number. When the caller identification number matches the personal identification number, the service control point instructs the switch to complete the call between the subscriber terminal and the outside party terminal. When the identification number does not match the personal identification number, the service control point instructs the switch to terminate the call.

Furthermore, the service control point may transmit in near real-time the one of the incoming call data and the outgoing call data to the service management system. The service management system displays the incoming call data or the outgoing call data on the graphical user interface upon receiving the incoming call data or the outgoing call data.

The service control point may store at least one time schedule associated with the subscriber. The at least one time schedule includes activation and deactivation times for controlling and monitoring telephone calls. The service control point determines a match between the at least one restricted number and the outside party telephone number only during the activation times for controlling and monitoring telephone calls. The service control point may also store at least one priority telephone number associated with the subscriber. The service control point determines whether the outside party telephone number matches the at least one priority telephone number. When the outside party telephone number matches the at least one priority telephone number, the service control point instructs the switch to connect the call between the subscriber terminal and the outside party terminal regardless of whether the outside party telephone number also matches the at least one restricted telephone number. When the outside party telephone number does not match the at least one priority telephone number, the service control point instructs the switch whether to connect the call in accordance with the at least one restricted telephone number.

Another aspect of the invention provides a system for selectively controlling and monitoring telephone calls with respect to a telephone number associated with a subscriber terminal. The system includes a service control point that stores multiple call control schedules, each of which includes at least one activation period in a week and at least one restricted telephone number corresponding to the at least one activation period. The system also includes a service management system connectable to the service control point and accessible by the subscriber via a graphical user interface through a packet switched data network and an interactive voice response system through a telecommunications network. The service control point receives an instruction to implement at least one of the call control schedules through the service management system. The service control point receives call data relating to a call involving the subscriber telephone number, the call data including the subscriber telephone number and an outside telephone number.

The service control point determines whether the call occurs within an activation period of the at least one call control schedule. When the call does occur within an activation period, the service control point determines whether the outside telephone number is the at least one restricted telephone number of the call control schedule. When the outside telephone number is the at least one restricted telephone number, the service control point terminates the call, stores the call data and transmits the call data to the service management system according to one of a predetermined transmission period and a request from the service management system to receive the call data. The service control point may transmit the call data to the service management system substantially simultaneously with the call involving the subscriber telephone number. Also, the service management system may format a report based on at least the call data and transmit the report to the subscriber through the graphical user interface or the interactive voice response system, according to instructions provided by the subscriber through the graphical user interface.

The service control point may store a personal identification number associated with the subscriber. The personal identification number is provided by the subscriber through the service management system. When the outside telephone number matches the at least one restricted telephone number, the service control point requests entry of the personal identification number. When the service control point receives the personal identification number in response to the request, the service control point connects the call between the subscriber telephone number and the outside telephone number.

The various aspects and embodiments of the present invention are described in detail below.

The present invention allows subscribers to selectively restrict telephone calls to and from the subscriber's telephone. In particular, the service receives restricted call data from the subscriber, identifies incoming and outgoing calls by calling party number and called party number, and terminates restricted calls according to the subscriber's restricted call data. The restricted call data includes, for example, restrictions on calls to and from selected telephone numbers, or groups of telephone numbers. For example, the restrictions include specific telephone numbers of parties from which the subscriber does not wish to receive call, such as harassing callers and telemarketers. Additionally, the subscriber may likewise restrict outgoing calls to specific telephone numbers, or groups of telephone numbers, such as "900" numbers or long distance numbers, generally.

The calling restriction data may also include time of day, day of week applicability. For example, the subscriber may specify that no calls are to be received after a certain time, e.g., 10 p.m., on weekdays. Significantly, the subscriber retains the ability to override the incoming and outgoing call restrictions, on a call-by-call basis, by entering a personal identification number (PIN). Also, the subscriber may create a list of priority numbers, which includes telephone numbers that are not affected by the incoming or outgoing call restrictions, without requiring a blocking override PIN. For example, an outgoing call restriction that disables all calls from the subscriber's telephone after 10:00 p.m. would have as an exception calls to a predesignated telephone number (i.e., a priority number) of a close relative, thus enabling outgoing calls to that number after 10:00 p.m., without the extra step of entering the blocking override PIN. The call monitoring service also allows calls from the subscriber telephone to "escape" numbers, such as 911 and local fire and police departments, even during periods of call restriction, without the subscriber specifically identifying the escape numbers as priority numbers.

The subscriber is able to generate reports indicating the incoming and outgoing calls that were selectively restricted (i.e., blocked) by the call monitoring service. In an embodiment, the subscriber accesses the restricted call data over a packet switched data network, such as the Internet or a corporate intranet, or over the PSTN by way of an interactive voice response (IVR) system. The subscriber is also able to customize and design reports, including various formats, via the packet switched data network.

FIG. 1 illustrates an exemplary telecommunications network, in association with the present invention, for implementing the call monitoring service. The telecommunications network includes an outside party telephone 20, a first service switching point (SSP) 21, a second SSP 24 and a subscriber telephone 25. The subscriber telephone 25 is any type of PSTN compatible telephone, including a plain old telephone service (POTS) telephone, or a telephone in a Centrex system, a PBX system or electronic key telephone system (EKTS). The exemplary network also includes a signaling transfer point (STP) 22, a service control point (SCP) 23 and an IVR 45.

By way of example, the SCP 23 is implemented with the Bellcore Integrated Service Control Point, loaded with ISCP software Version 4.4 (or higher), available from Telecordia, Murray Hill, N.J. In an alternative embodiment of the invention, the SCP 23 may be a Lucent Advantage SCP, with software release 94, available from Lucent Technologies, Inc. An exemplary IVR 45 is available under the trademark CONVERSANT System for IVR, Version 6.0, Update 1, provided by Lucent Technologies, Inc. The network alternatively incorporates any compatible stand-alone IVR or advanced intelligence network-intelligent peripheral (AIN-IP) that includes IVR capability.

Depending on the call origination point, the SSP 21 and the SSP 24 may be either the originating or the terminating switch. For example, if a call is placed from the outside party telephone 20 to the subscriber telephone 25, the SSP 21 is the originating switch and the SSP 24 is the terminating switch. If a call is placed from the subscriber telephone 25 to the outside party telephone 20, the SSP 24 is the originating switch and SSP 21 is the terminating switch. However, as a practical matter, the originating switch and the terminating switch may be the same, or the call may be routed through any number of intervening switches in the PSTN between the originating and the terminating switches. The SSPs 21 and 24 include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN Release 0.1 protocol. However, embodiments of the present invention may incorporate switches, such as ATM switches, that are incorporated into any alternative telecommunications technology.

The call flow logic of the present invention may be upgraded to accommodate future AIN releases and protocols and future trigger types. Specifications of AIN Release 0.1 SSPs may be found in Bellcore TR-NWT-001285, Switch-Service Control Point Application Protocol Interface Generic Requirements, and Telecordia Technical Reference TR-NWT-001284, AIN Switching Systems Generic Requirements, the disclosures of which are expressly incorporated by reference herein in their entireties.

A data network of the invention includes a web client 30, a web server 54 and a service management system (SMS) 48, connectable through the Internet 44. The web client 30 includes a graphical user interface (GUI) 32, i.e., a personal computer (PC), operating client software 34, an example of which is ICW Client, available from Southwestern Bell Telephone Company. The SMS 48 is capable of transmitting and receiving information to and from the SCP 23. Alternatively, the client software 34 can be run at the web server 54. The SMS 48 provides the subscriber interface to the SCP 23 both from the subscriber phone 25 (or other DTMF telephone) through IVR 45 and from the web client 30 (or other Internet compatible device) through the web server 54, via the Internet 44. The SMS 48 also stores and distributes subscriber specific data relating to the call monitoring services, including account numbers, PIN numbers, call specific data and subscriber report information.

The web client 30 incorporates a web browser, such as Microsoft Internet Explorer, available from Microsoft Corporation, or Netscape Navigator, available from Netscape Communications Corporation. In one embodiment, the web client 30 is implemented with an IBM Pentium based PC, running the Linux operating system, available from, for example, Free Software Foundation, Inc., or the Microsoft Windows operating system, and running the Microsoft Internet Explorer, Netscape Navigator or HotJava, available from Sun Microsystems, Inc., web browser software. An embodiment of the invention includes the web server 54 running the Linux or Microsoft Windows operating system and the Apache web server software, available from the Apache Software Foundation, or the Jigsaw web server software, available from World Wide Web Consortium (W3C).

The call monitoring service includes numerous features in various embodiments of the invention. For example, the subscriber may turn the call monitoring service ON or OFF, create a time of day, day of week schedule for restricting telephone calls, create and maintain lists of restricted telephone numbers (and groups of telephone numbers) for incoming and/or outgoing calls, and create and maintain lists of priority telephone numbers (and groups of telephone numbers) that are not subject to restriction regardless of other time or telephone number related restrictions. The subscriber may bypass any restrictions by entering a blocking override PIN, enabling the call to process normally. The subscriber may also receive visually formatted reports and verbally formatted reports regarding blocked incoming and outgoing calls via the Internet 44 and the IVR 45, respectively. The reports may be customized to the subscriber's specifications. The restricted call data may be monitored in near real time by the subscriber at the GUI 32 via the Internet 44.

The subscriber interactively accesses the call monitoring service by either of two methods. First, from any DTMF telephone, the subscriber dials a toll-free number, e.g., an 800 number or local service provider number, to access the IVR 45. The subscriber is prompted to enter an account number, along with a password or PIN (which may or may not be the same as the blocking override PIN), further discussed below. The subscriber then has the ability to change any PINs (including the account access PIN and the blocking override PIN), toggle the service ON and OFF and activate or deactivate restriction lists, the priority lists and schedules. Second, the subscriber has the option to access the call monitoring service using the GUI 32 via the Internet 44. The subscriber is able to implement all of the IVR functions identified above, as well as customize reports and report formats, and monitor the service in near real time.

Figure 2:
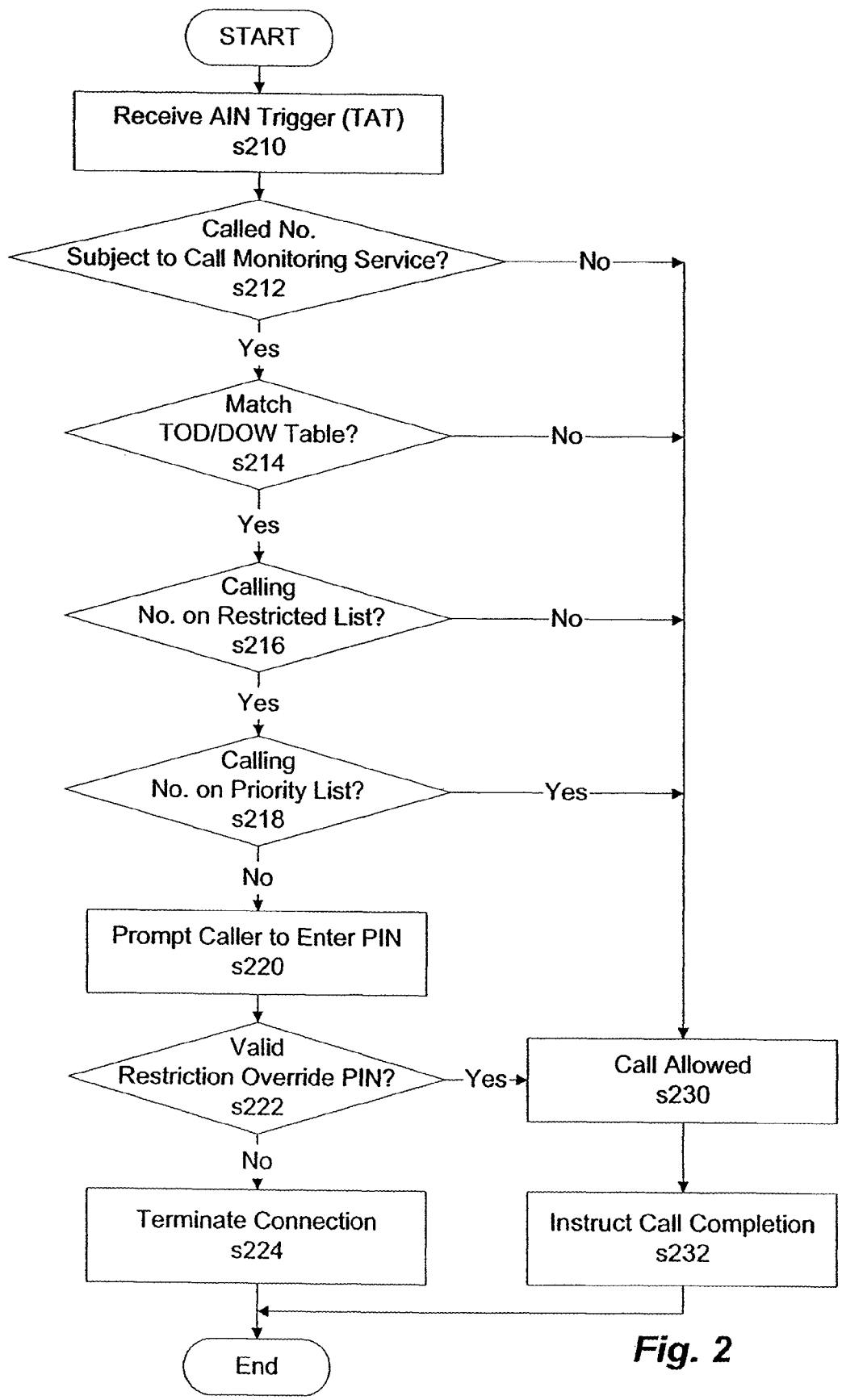
FIG. 2 is a flowchart of exemplary SCP service logic for the call monitoring service, according to an aspect of the present invention.

FIG. 2 is an exemplary flow diagram depicting implementation of the call monitoring service with respect to incoming calls, according to the service logic of the SCP 23, in one embodiment of the invention. The call originates from the outside party telephone 20, and is connected to the terminating SSP 24 through the originating SSP 21, by known processes. At step s210, the SCP 23 receives a standard AIN prompt from the terminating SSP 24, notifying the SCP 23 of the attempted termination of the call to the subscriber telephone 25. The AIN prompt includes at least the calling party number and the called party number, which correlate to the telephone numbers of the outside party telephone 20 and the subscriber telephone 25, respectively. The AIN prompt, which initiates the call monitoring service logic at the SCP 23, may be, for example, a terminating attempt trigger (TAT). As the SCP 23 begins to process the service logic in response to the trigger, the call is suspended at the terminating SSP 24.

Based on the called party number in the AIN prompt, the SCP 23 determines at step s212 whether the subscriber telephone 25 subscribes to the call monitoring service using, for example, an internal look-up table that associates telephone numbers with AIN services. When the SCP 23 determines that the called party number does not participate in the call monitoring service, the call is allowed at step s230. The SCP 23 accordingly instructs the SSP 24 to complete the call at step s232. Of course, the call is subject to any other AIN services associated with the subscriber telephone 25 and outside party telephone 20, as determined by the SCP 23, prior to instruction to complete the call.

When the subscriber telephone 25 is determined to correspond to a call monitoring service subscription, the SCP 23 determines at step s214 whether the call blocking feature of the call monitoring service is active, according to a schedule previously established by the subscriber. The SCP 23 may also determine whether the call monitoring service itself is ON or OFF (not pictured). When the service is OFF, the call is allowed to complete at steps s230 and s232.

In an embodiment of the invention, the schedule is a time of day, day of week table stored at the SCP 23. At step s214, the SCP 23 determines whether there is a match in the time of day, day of week table, based on the time and date of the call. The time of day, day of week schedule includes a table of at least one date and time period, during which the call blocking feature of the call monitoring service is active. During the date and time period, it is assumed that the SCP 23 has been instructed to block all incoming calls to the subscriber telephone 25, except those on the priority list, discussed below. The date and time information of the schedule is provided by the subscriber to the service provider any number of ways, including contacting a customer service representative of the service provider by telephone or interfacing with the SCP 23 by way of SMS 48, using the Internet 44 or the IVR 45, as discussed below.

When there is not a match in the time of day, day of week table, the SCP 23 determines that the call blocking feature is not active. Therefore, all incoming calls are allowed at step s230. The SCP 23 instructs the SSP 24 to connect the call to the subscriber telephone 25 at step s232. When there is a match in the time of day, day of week table, the SCP 23 accesses any restriction list identified in the table. At step s216, the SCP 23 determines whether the calling party number is specifically identified as an incoming restricted number based on an incoming restriction list. Incoming restricted numbers include specific telephone numbers, calls from which the subscriber wishes to avoid receiving during the time period specified in the schedule. The numbers are stored, for example, in an incoming restriction table in the SCP 23. Incoming restricted numbers also include groups of telephone numbers, such as "out of area" numbers or numbers from a particular area code, that the subscriber wishes to avoid receiving. The incoming restricted numbers are provided to the SCP 23 through any number of avenues, including communication through customer service representatives of the service provider or through the SMS 48, via the Internet 44 or the IVR 45, as discussed below.

When the SCP 23 identifies the calling party number as an incoming restricted number, the SCP 23 determines at step s218 whether the calling party number has been previously identified by the subscriber as an incoming priority number, i.e., a number that is always permitted to be connected to the subscriber telephone 25 regardless of whether the call blocking feature is active. For example, an incoming priority number is permitted to connect even when the subscriber designates that ALL incoming calls are to be blocked during a particular time period. The SCP 23 compares the calling party number to an incoming priority list, which may be stored in a table at the SCP 23 and associated with the subscriber's call monitoring service account. The incoming priority list is pre-established by the subscriber and includes important telephone numbers, from which incoming calls are never blocked. For example, a subscriber, who has the call monitoring service for his residence, may include a work telephone number on the incoming priority list. Then, regardless of the time of day or the day of week, calls from the office telephone will not be blocked. The SCP 23 determines that the call is allowed at step s230 and the call is completed by the terminating SSP 24 at step s232.

When the calling party number is not on the incoming priority list, the SCP 23 instructs the SSP 24 at step s220 to play an announcement advising the calling party that the call monitoring service has blocked the call and providing various options to the calling party, including the option to enter a blocking override PIN to bypass the call blocking feature of the service. For example, in an embodiment of the invention that includes forwarding blocked calls to a voice mail service, the announcement queries the caller: "Please press the pound key followed by your PIN to bypass call blocking; otherwise, please leave a message after the tone."

At step s222 the SCP 23 determines whether it has received a valid blocking override PIN associated with the subscriber account. If no PIN is received, or if an invalid PIN is received, the call is terminated at step s224. In an alternative embodiment of the invention, the SCP 23 may instruct the SSP 24 to play a second announcement whenever an invalid PIN is received, advising the caller that the PIN is not valid and to please try again. The call is then terminated at step s224 only after the second attempt to enter a valid blocking override PIN has failed. Whenever a valid blocking override PIN is received by the SCP 23 via the SSP 24, the call is allowed at step s230 and the SCP 23 instructs the SSP 24 to connect the calling party to the subscriber telephone 25 at step s232.

In an alternative embodiment of the invention, the PIN announcement is played by a platform other than the SSP 24, such as a service node-intelligent peripheral (SN-IP). In this embodiment, the SCP 23 instructs the SSP 24 to forward the incoming call to the SN-IP, which plays the PIN announcement, receives the caller's digital response and determines whether the entered number matches the blocking override PIN. When the SN-IP determines that the number matches the blocking override PIN, the call is returned to the SSP 24, which is then instructed by the SCP 23 to connect the call to the subscriber telephone 25.

Figure 3:
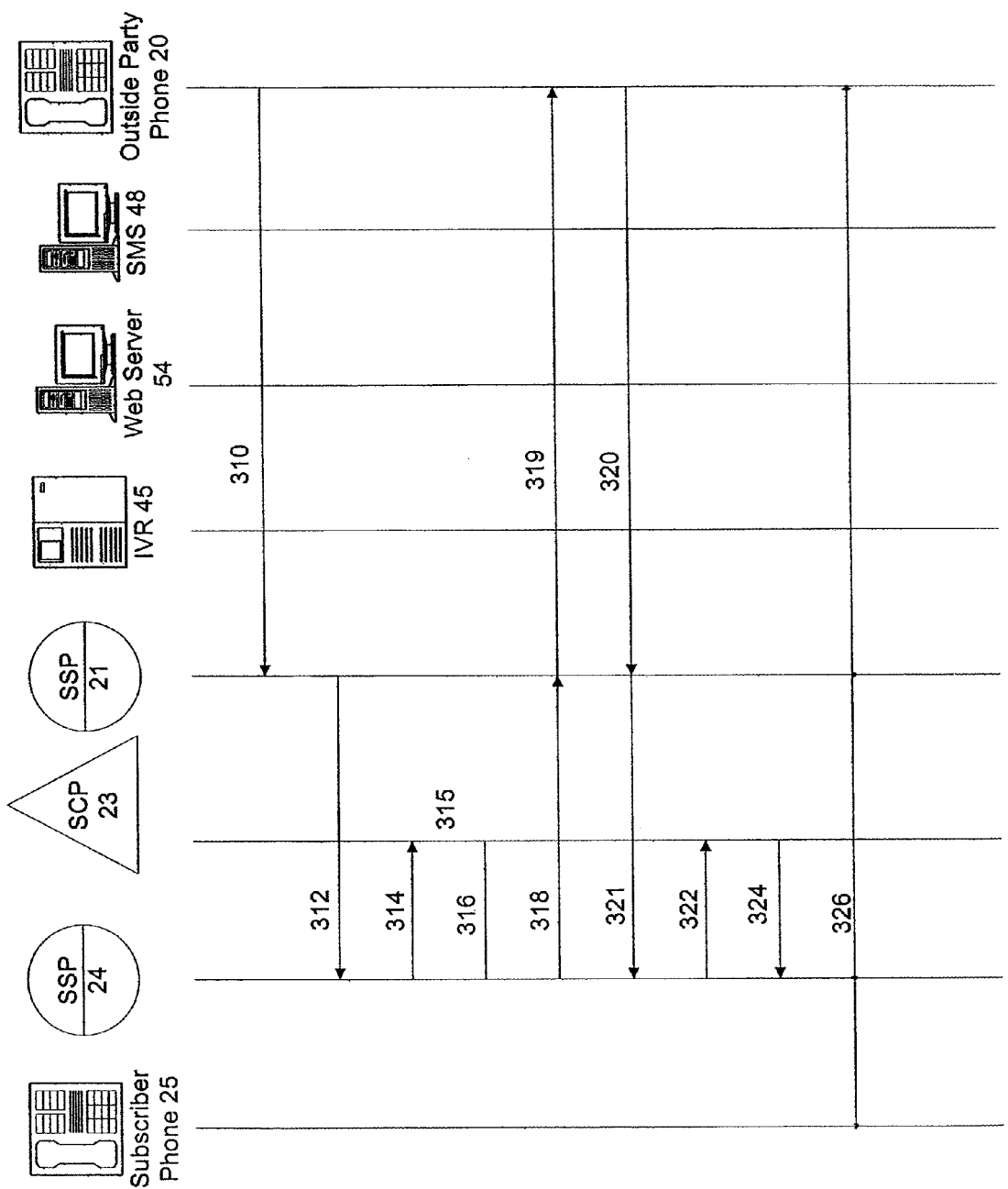
FIG. 3 is an exemplary call monitoring service call flow diagram showing routing of a telephone call incoming to a subscriber's telephone, according to an aspect of the present invention.

FIG. 3 is a call flow diagram depicting an exemplary implementation of the call monitoring service based on an incoming call initiated by a calling party from the outside party telephone 20 to the subscriber telephone 25. In particular, FIG. 3 depicts an exemplary situation in which the attempted telephone call is rejected by the SCP 23, based on a match with the time of day, day of week schedule and the calling party number being an incoming restricted number (e.g., steps s214-s216 of FIG. 2), and in which the calling party (e.g., the subscriber) bypasses the call blocking feature implemented by the call monitoring service by entering a blocking override PIN.

In particular, the calling party initiates the call from the outside party telephone 20, connecting to the originating SSP 21 by going off-hook at step 310. Upon receiving a dial tone, the calling party dials the digits of the called party number, which is the telephone number of the subscriber telephone 25. In response to the dialed digits, the SSP 21 routes the call to the terminating SSP 24 at step 312, either directly, as shown in FIG. 3, or via any number of intervening switches. The SSP 24 launches a TAT trigger, which includes at least the calling party number and the called party number, via the SS7 network and the appropriate STP 22 (not pictured in FIG. 3) to the subscriber's serving SCP 23 at step 314.

At step 315, the SCP 23 executes the SCP service logic depicted, for example, by the flow diagram of FIG. 2. Accordingly, the SCP 23 determines whether the subscriber telephone 25 is associated with the call monitoring service, whether the call blocking feature of the service is active according to the time of day, day of week schedule, whether the calling party number is on the incoming restriction list and whether the calling party number is on the incoming priority list. FIG. 3 depicts the process whenever the SCP 23 determines at step 315 that the time of day, day of week schedule indicates that the call blocking feature is currently active and that the calling party number is on the incoming restriction list, but not on the incoming priority list. In other words, the call is blocked. Whenever the call is blocked, the SCP 23 stores the associated call data, including the calling party number, the called party number and the date and time of the call. In an alternative embodiment of the invention, the call data is stored in an external database, which reduces the data storage burden on the SCP 23.

Therefore, at step 316, the SCP 23 instructs the SSP 24 to play an announcement (via SSP 21) denying the connection and requesting entry of a blocking override PIN, as indicated by steps 318 and 319. The calling party receives the announcement and enters a four digit PIN, for example, using the push-button keys of the outside party telephone 20. The numbers are received by SSP 24 via SSP 21 at steps 320 and 321, and forwarded to the SCP 23 at step 322. The SCP 23 compares the numbers entered at the outside party telephone 20 with the previously established blocking override PIN, stored in the SCP 23 in association with the subscriber's call monitoring service account. When the SCP 23 determines that the entered numbers match the stored blocking override PIN, it instructs the SSP 24 at step 324 to complete the telephone call. The result is the connection shown in step 326 between the outside party telephone 20 and the subscriber telephone 25, via the originating SSP 21 and the terminating SSP 24.

FIGS. 2 and 3 depict exemplary embodiments of the invention in which calls are placed from the outside party telephone 20 to the subscriber telephone 25 (i.e., incoming calls), which is associated with the call monitoring service. In contrast, FIGS. 4 and 5 depict exemplary embodiments of the invention in which calls are placed from the subscriber telephone 25 to the outside party telephone 20 (i.e., outgoing calls), which incorporates a similar process.

Figure 4:
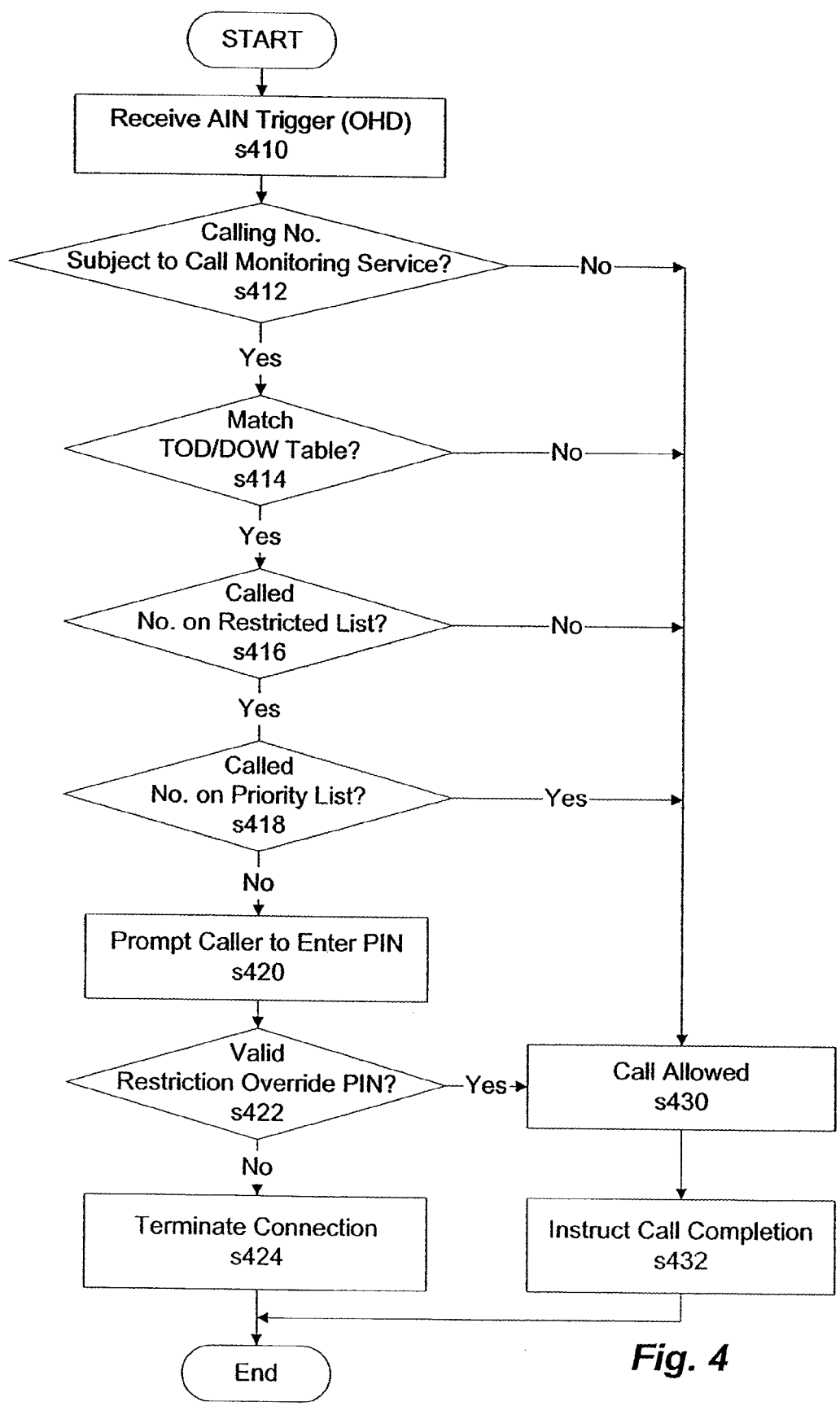
FIG. 4 is a flowchart of exemplary SCP service logic for the call monitoring service, according to an aspect of the present invention.
Figure 5:
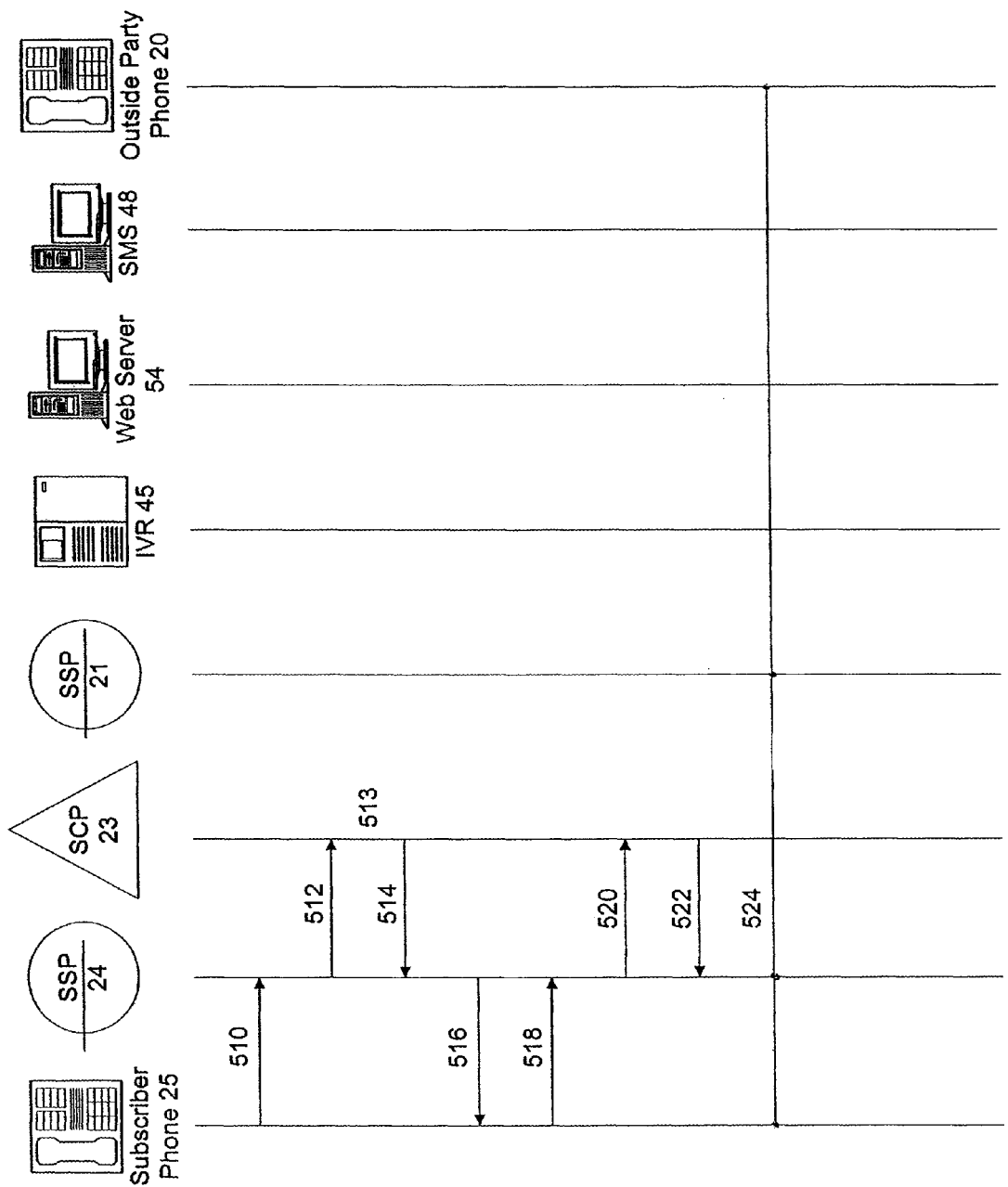
FIG. 5 is an exemplary call monitoring service call flow diagram showing routing of a telephone call outgoing from a subscriber's telephone, according to an aspect of the present invention.

FIG. 4 is an exemplary flow diagram depicting implementation of the call monitoring service with respect to outgoing calls, according to the service logic of the SCP 23. The call originates at the subscriber telephone 25, and is connected to the outside party telephone 20 via the originating SSP 24 and the terminating SSP 21, by known processes. At step s410, the SCP 23 receives a standard AIN prompt from the originating SSP 24, notifying the SCP 23 that the subscriber telephone 25 has gone off-hook and numbers have been dialed. In an embodiment of the invention, the AIN prompt is the off-hook delay (OHD) trigger and includes at least the calling party number and the called party number, which correlate to the telephone numbers of the subscriber telephone number 25 and the outside party telephone 20, respectively. As the SCP 23 processes the service logic in response to the trigger, the call is suspended at the originating SSP 24.

Based on the calling party number provided by the OHD trigger, the SCP 23 determines at step s412 whether the subscriber telephone 25 subscribes to the call monitoring service using, for example, an internal look-up table that associates telephone numbers with AIN services. When the SCP 23 determines that the calling party number is not included among the call monitoring service accounts, the call is allowed at step s430. The SCP 23 accordingly instructs the SSP 24 to complete the call at step s432. Of course, the call is subject to any other AIN services associated with the subscriber telephone 25 and the outside party telephone 20, as determined by the SCP 23, prior to instruction to complete the call.

When the subscriber telephone 25 is determined to be associated with the call monitoring service, and the call monitoring service is determined to be ON (not pictured), the SCP 23 determines whether the call blocking feature of the call monitoring service is active, according to a schedule previously established by the subscriber. In an embodiment, the schedule is a time of day, day of week table stored at the SCP 23. The schedule includes activation and deactivation times and dates for both incoming and outgoing call blocking, as well as outgoing restricted numbers and outgoing priority numbers associated with the activation periods. In an alternative embodiment of the invention, the subscriber is provided a dedicated schedule for incoming calls and a different schedule for outgoing calls. Separate schedules enable the subscriber to more particularly tailor the call monitoring service. For example, the subscriber may desire to restrict all incoming calls after 9:00 p.m. (other than priority calls) to avoid being disturbed at home in the evening; however, the subscriber may also desire to freely place outgoing calls during the same time period without having to enter the call blocking override PIN each time.

At step s414, the SCP 23 determines whether there is a match in the time of day, day of week table, based on the time and date of the call. As described above with respect to step s214 of FIG. 2, the time of day, day of week schedules includes a table of at least one date and time period, during which the call blocking feature of the call monitoring service is active. During the specified date and time period, the SCP 23 blocks all outgoing calls from the subscriber telephone 25, unless otherwise specified, except calls to numbers on the outgoing priority list, discussed below. Alternatively, the caller may provide a list of specific telephone numbers to which outgoing calls are blocked, as discussed below. The date and time information is provided to the SCP 23 through any number of avenues, including through a customer service representative of the service provider or through the SMS 48, via the Internet 44 or the IVR 45, as discussed below.

When there is not a match in the time of day, day of week table, the SCP 23 determines that the call blocking feature of the call monitoring service is not active. Therefore, all outgoing calls are allowed at step s430. The SCP 23 accordingly instructs the SSP 24 to connect the call from the subscriber telephone 25 at step s432, subject to any additional AIN services associated with the calling party number and the called party number.

When there is a match in the time of day, day of week table, the SCP 23 determines whether the called party number (i.e., the telephone number of the outside party telephone 20) is specifically identified as an outgoing restricted number by consulting the outgoing restriction list at step 416. The outgoing restriction list may include any telephone number or group of telephone numbers to which the subscriber wants to prevent outgoing calls during the identified time period. For example, the subscriber may include specific telephone numbers, which are stored, for example, in an outgoing restriction table in the SCP 23. Alternatively, the subscriber may identify types of telephone numbers, such as 900 numbers or numbers to a particular area code, that the subscriber wishes to prevent. The subscriber, however, is not able to include in the outgoing restriction list any designated escape numbers, such as 911, the local police department and fire departments and other emergency numbers identified by the service provider. The outgoing restriction list is stored at the SCP 23. The outgoing restricted numbers are provided to the SCP 23 through any number of avenues, including through a customer service representative of the service provider or through the SMS 48, via the Internet 44 or the IVR 45, as discussed below.

In an embodiment of the invention, the subscriber may build multiple outgoing restriction lists, as well as incoming restriction lists, and identify them numerically, for example. The subscriber may then selectively specify activation and deactivation of different outgoing and/or incoming restriction lists in conjunction with pre-scheduled dates and times, stored in the time of day, day of week table at the SCP 23. Alternatively, the subscriber may identify a master outgoing restriction list, which includes numbers previously identified by the subscriber as those numbers that are blocked regardless of times and dates provided in the time of day, day of week scheduler.

In another embodiment, the outgoing restriction list and the incoming restriction list are the same list (e.g., stored in a single table), thereby reducing the amount of memory occupied in the SCP 23. The limitations of a single restriction list may have little practical effect because subscribers would likely not want incoming calls from telephone numbers which have been blocked for outgoing calls.

When the SCP 23 determines that the called party number is not an outgoing restricted number, the outgoing call is allowed at step s430. The SCP 23 accordingly instructs the SSP 24 to connect the call from the subscriber telephone 25 at step s432. When the SCP 23 identifies the called party number as an outgoing restricted number, the SCP 23 determines whether the called party number has been previously identified by the subscriber as a priority number, i.e., a number that is always permitted to be connected from the subscriber telephone regardless of whether the call blocking service is active for all other outgoing numbers. The SCP 23 compares the called party number to an outgoing priority list at step s418, which may be a table stored at the SCP 23 and associated with the subscriber. When the SCP 23 determines that the called party number is on the outgoing priority list, the call is allowed at step s430 and the call is completed by the terminating SSP 21 at step s432.

The outgoing priority list is previously established by the subscriber and includes important telephone numbers to which outgoing calls are never blocked. For example, a subscriber, who has the call monitoring service for his residence, may identify a work telephone number to be on the outgoing priority list. Then, regardless of the time of day or the day of week schedule and the scope of the outgoing restriction list, calls from the subscriber telephone 25 to the office telephone will not be blocked. Use of the outgoing priority list would be useful for assuring that the subscriber's children, for example, would always be able to contact the subscriber's work phone from the subscriber's home without having to enter a call blocking override PIN.

In an embodiment, the same priority list is used to test both outgoing and incoming calls. In an alternative embodiment of the invention, the subscriber has an incoming priority list and an outgoing priority list, which are populated separately by the subscriber. Also, as in the case of the outgoing and incoming restriction lists, the subscriber may build multiple outgoing and incoming priority lists and identify them numerically, for example. The subscriber may then selectively specify activation and deactivation of different outgoing and/or incoming priority lists in conjunction with pre-scheduled dates and times, stored in the time of day, day of week table at the SCP 23.

When the called party number is not on the outgoing priority list, the SCP 23 instructs the SSP 24, at step s420, to play an announcement advising the calling party that the call monitoring service has blocked the call and providing an option for the calling party to enter a blocking override PIN at the subscriber telephone 25 to bypass the blocking feature. For example, in an embodiment of the invention, the announcement queries the caller: "Please press the pound key followed by your PIN to bypass call blocking; otherwise, please try again later."

At step s422, the SCP 23 determines whether it has received a valid blocking override PIN associated with the subscriber account. If no PIN is received, or if an invalid PIN is received, the call is terminated at step s424.

The blocking override PIN for outgoing calls may be the same blocking override PIN used to override call blocking of incoming telephone calls, which enables the subscriber to memorize only a single PIN to control the call monitoring service. Alternatively, separate blocking override PINs may be provided for overriding call blocking of incoming and outgoing calls, respectively. Separate PINs enable the subscriber to control more closely the call monitoring process. For example, when the subscriber is part of a family, the subscriber may want the children to have the PIN for overriding incoming call blocking. The children would therefore always be able to call home, regardless of the time of day or night, and regardless of the telephone number from which they are calling. However, the subscriber may not want the children to be able to override call blocking of outgoing calls, which ability may defeat the purpose of having the call monitoring service. Therefore, the subscriber would not inform the children of the blocking override PIN associated with overriding call blocking of outgoing calls.

In an alternative embodiment of the invention, the SCP 23 may instruct the SSP 24 to play a second announcement whenever an invalid PIN is received, advising the calling party that the entered number is not valid and to please try again. The call is then terminated at step s424 only after the second attempt to enter a valid blocking override PIN has failed. Whenever a valid blocking override PIN is received by the SCP 23 via the SSP 24, the call is allowed at step s430 and the SCP 23 instructs the SSP 24 to connect the calling party to the outside party telephone 20 at step s432.

FIG. 5 is a call flow diagram depicting an exemplary implementation of the call monitoring service based on an outgoing call initiated by a calling party from the subscriber telephone 25 to the outside party telephone 20. In particular, FIG. 5 depicts an exemplary situation in which the attempted telephone call is rejected by the SCP 23, based on a match with the time of day, day of week schedule and the called party number being an outgoing restricted number (e.g., steps s414-s416 of FIG. 4), and the caller (e.g., the subscriber) bypasses the call blocking implemented by the call monitoring service by entering a blocking override PIN.

In particular, the calling party initiates the call from the subscriber telephone 25, connecting to the originating SSP 24 by going off-hook at step 510. Upon receiving a dial tone, the calling party dials the digits of the called party number, which, in this example, is the telephone number of the outside party telephone 20. In response to the dialed digits, the SSP 24 suspends that call and launches an OHD trigger, which includes at least the calling party number and the called party number, via the SS7 network and the appropriate STP 22 (not picture in FIG. 5) to the subscriber's serving SCP 23 at step 512.

At step 513, the SCP 23 executes the SCP service logic depicted, for example, by the flow diagram of FIG. 4. Accordingly, the SCP 23 determines whether the subscriber telephone 25 is associated with the call monitoring service, whether the call blocking feature of the service is active according to the time of day, day of week schedule, whether the called party number is on the outgoing restricted list and whether the called party number is on the priority list (thus enabling access regardless of the time of day, day of week and the scope of the outgoing restricted list). FIG. 5 depicts the process whenever the SCP 23 determines at step 513 that the time of day, day of week schedule indicates that the call blocking feature is currently active and that the called party number is on the outgoing restriction list, but not on the outgoing priority list. In other words, the outgoing call is blocked. Whenever the call is blocked, the SCP 23 stores the associated call data, including the calling party number, the called party number and the date and time of the attempted call. In an alternative embodiment of the invention, the call data is stored in an external database, which reduces the data storage burden on the SCP 23.

At step 514, the SCP 23 instructs the SSP 24 to play an announcement to the calling party at the subscriber telephone 25 denying the connection and requesting entry of a blocking override PIN, as indicated by step 516. The calling party receives the announcement and enters a PIN, for example, using the push-button keys of the subscriber telephone 25. The blocking override PIN is received by SSP 24 at step 518 and forwarded to the SCP 23 at step 520. The SCP 23 compares the numbers entered at the subscriber telephone 25 with the previously established blocking override PIN, stored in the SCP 23 in association with the subscriber's call monitoring service account. When the SCP 23 determines that the entered numbers match the stored blocking override PIN, it instructs the SSP 24 at step 522 to complete the telephone call. The result is the connection shown in step 524 between the subscriber telephone 25 and the outside party telephone 20, via the originating SSP 24 and the terminating SSP 21.

Figure 6:
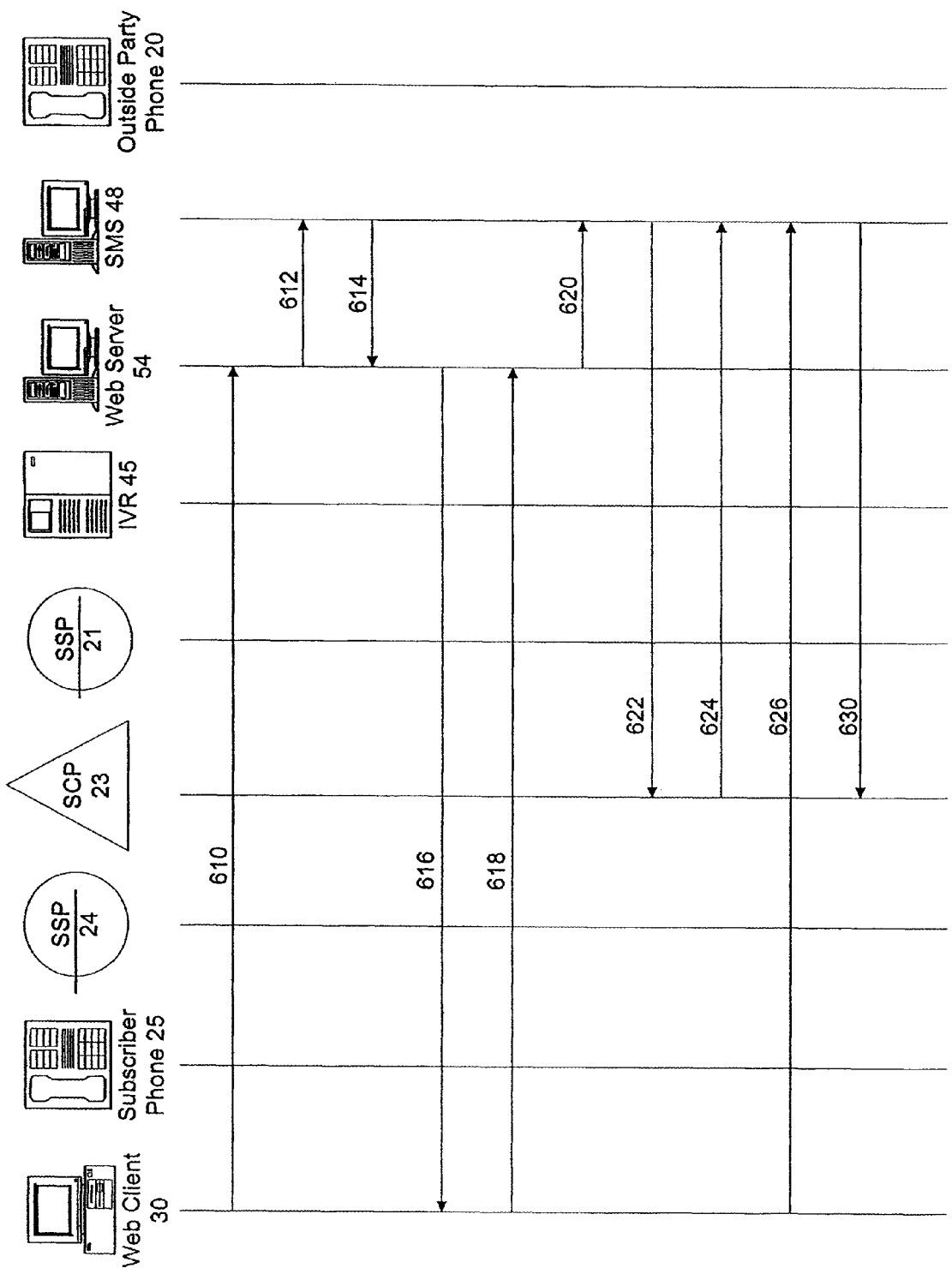
FIG. 6 is an exemplary call flow diagram in which the subscriber accesses the call monitoring service via the Internet, according to an aspect of the present invention.

As stated above, the call monitoring service enables interaction with the subscriber over the Internet 44 and the IVR 45. FIG. 6 is a call flow diagram depicting an exemplary interaction between the subscriber and the call monitoring service by accessing the SMS 48 over the Internet 44. The subscriber accesses a unique uniform resource locator (URL) associated with the service provider. The URL is an address that identifies the appropriate protocol for communicating with the service over the Internet 44. When the subscriber accesses the Internet 44, the web server 54 provides call monitoring service web screens, transmitted from the SMS 48, to be displayed at the GUI 32. Examples of the call monitoring service web screens are shown in FIGS. 7-12. In an alternative embodiment, the call monitoring service may be accessed via the Internet 44 is through the PCM service, described in U.S. patent application Ser. No. 09/716,276 to Anil Kumar BHANDARI et al., filed on Jul. 19, 2000.

At step 610 of FIG. 6, the subscriber connects from the web client 30 to the web server 54 through the Internet 44. The web server 54 then connects to the SMS 48, which stores and updates the call monitoring service data, as well as associated authentication data, at step 612. Once connected to the SMS 48 via the web server 54, the subscriber must be authenticated to access the corresponding service account. The SMS 48 queries the subscriber for authentication data, which may include an account number and an associated account access PIN, via the web server 54, at steps 614 and 616. The account access PIN may be the same series of numbers as the blocking override PIN, which enables the subscriber to bypass the call blocking feature of the call monitoring service. Alternatively, the account access PIN and the blocking override PIN are different to ensure that other individuals who have access to the blocking override PIN are not able to access the account over the Internet 44 and change the various settings, including, for example, the account access PIN. The subscriber is able to interactively change all PIN numbers associated with the call monitoring service account over the Internet 44, as well as through the IVR 45.

The subscriber authentication responses are received at the web server 54 at step 618, and forwarded to the SMS 48 for authentication at step 620. Alternatively, web server 54 may perform the authentication step based on information sent from SMS 48. The SMS 48 retrieves the account number and associated account access PIN to confirm that the subscriber is authorized to access the account information.

After a successful authentication, the SMS 48 queries the SCP 23 to retrieve the data associated with the subscriber's call monitoring service account at step 622. The SCP 23 retrieves the subscriber's data, schedules, incoming and outgoing restriction lists and incoming and outgoing priority lists. The SCP 23 also retrieves the call data associated with the incoming and outgoing calls that were blocked. In an embodiment of the invention, the SMS 48 maintains a database of all of the call monitoring service data related to each subscriber, and merely updates the data from the SCP 23 during each interaction. Alternatively, the SCP 23 periodically transmits all call monitoring service data related to each subscriber regardless of whether the subscribers have actually requested their respective account data from the SMS 48. The SMS 48 would then be able to provide the subscriber with relatively recent data without performing steps 622 and 624, which saves additional processing by the SCP 23. Steps 622 and 624 would be performed only when the subscriber specifically requests the most recent data or real time interaction, discussed below.

Once the SMS 48 has the call monitoring service data related to the subscriber's account, an interactive connection is maintained at step 626 among the SMS 48, the web server 54 and the web client 30. For example, the web server 54 receives HTTP messages from the subscriber at web client 30 and provides HTML web pages in response to the subscriber's input. The web pages relate to the subscriber's call monitoring service, as indicated by the SMS 48. Whenever the subscriber logs off of the call monitoring service web site, disconnecting the web sever 54 from the SMS 48, the SMS 48 automatically updates the SCP 23 at step 630 with the updated information provided by the subscriber. The SMS 48 may also provide updated information to the SCP 23 while the subscriber is still on-line, either periodically or in response to a specific command by the subscriber to do so. The SCP 23 stores the updated information received from the SMS 48 for immediate implementation in the PSTN.

FIGS. 7-12 are exemplary web pages provided the web client 30 by the SMS 48 by way of web server 54, according to an embodiment of the present invention. The actual layout of the web pages, as well as the specific options made available to the subscriber on the web pages, may vary.

Figure 7:
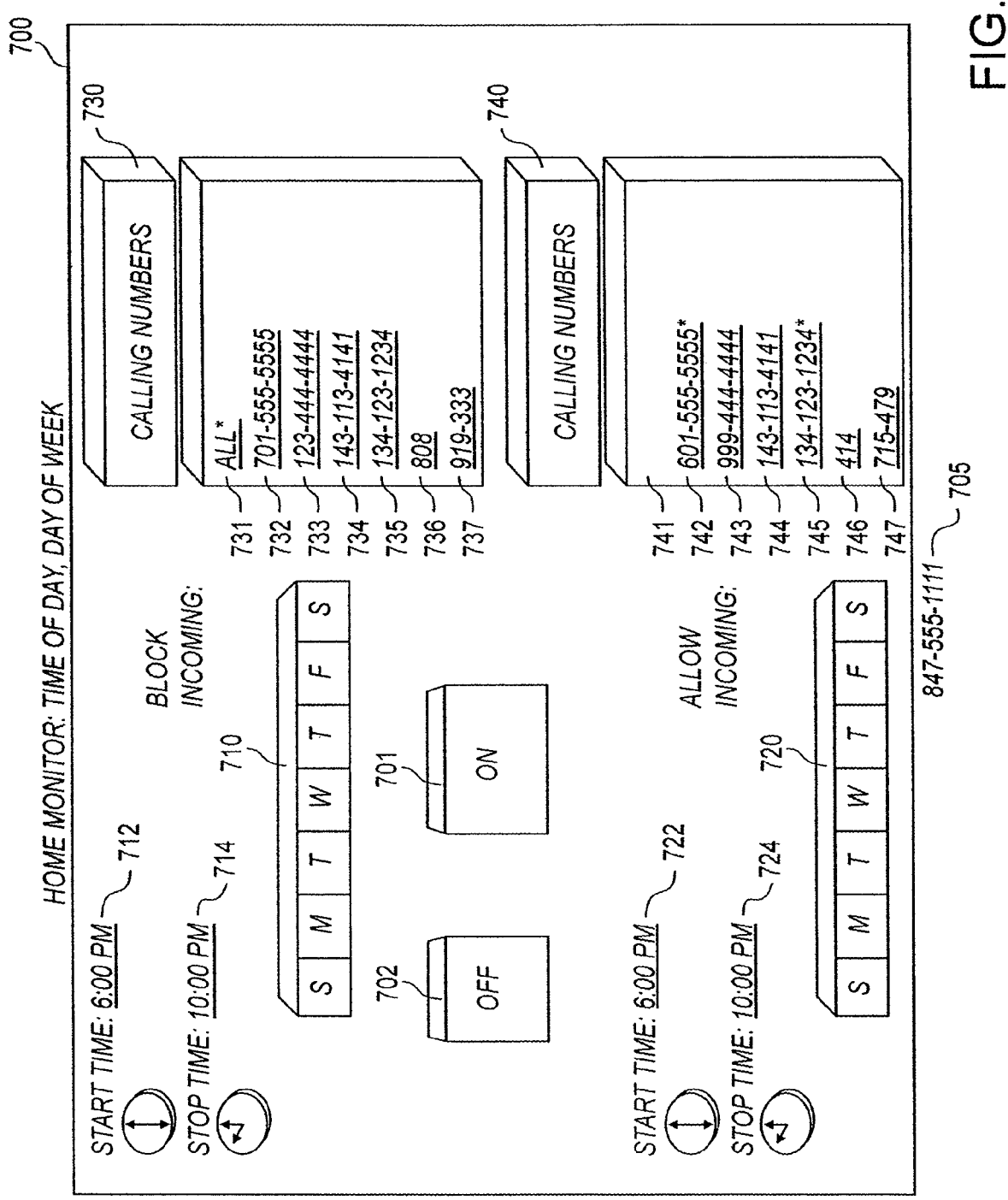
FIG. 7 is an exemplary web page to be displayed at the subscriber's PC showing a scheduler for incoming call blocking during weekdays, according to an aspect of the present invention.

FIG. 7 is an exemplary web page 700 displayed at GUI 32 after the subscriber has been successfully authenticated, as described with respect to steps 610-620 of FIG. 6. The web page 700 is a typical layout enabling the subscriber to schedule the call blocking feature for incoming calls to subscriber telephone 25. The telephone number 705 displayed at the bottom of the screen is the telephone number of the subscriber to which the call monitoring service corresponds. A subscriber may have multiple telephone numbers, in the case of a business, for example, which may be controlled and monitored independently or collectively, as desired by the subscriber.

The incoming call blocking feature of the call monitoring service can be turned ON and OFF using buttons 701 and 702, respectively. FIG. 7 indicates that the incoming call blocking feature is ON and therefore active. In an embodiment of the invention, the call blocking feature of the service is implemented separately from the scheduler. In other words, the subscriber may identify telephone numbers (or groups of telephone numbers) from which incoming calls are always blocked whenever the call monitoring service itself is activated.

The web page 700 indicates two sections related to incoming calls: the "Blocking Incoming" section, which is active with respect to the calling numbers list 730 from the start time 712 to the stop time 714, and the "Allow Incoming" section, which is active with respect to the calling numbers list 740 from the start time 722 to the stop time 724. The calling numbers lists 730 and 740 correlate to the incoming restriction list and the incoming priority list, described with respect to FIG. 2, above. According to the example shown in FIG. 7, the incoming restriction list of the "Blocking Incoming" section is active from 6:00 p.m. to 10:00 p.m., as indicated by the start time field 712 and the stop time field 714, respectively. The active period occurs each week day, Monday through Friday, as indicated by the highlighting of the M, T, W, T, F in the day field 710. The incoming priority list of the "Allow Incoming" section is likewise active from 6:00 p.m. to 10:00 p.m., as indicated by the start time field 722 and the stop time field 724, respectively. The active period occurs each week day, Monday through Friday, as indicated by the highlighting of the M, T, W, T, F in the day of the week field 720. The time period for activating the incoming restriction list usually matches the time period for incoming priority list. Therefore, in an embodiment of the invention, the web page 700 would include an option for the subscriber to simply select "same" (not pictured) with respect to the incoming priority list time period. In the example depicted in FIG. 7, the subscriber has instructed the blocking feature of the call monitoring service to block certain incoming calls, each weekday, from 6:00 p.m. through 10:00 p.m.

The subscriber selects the telephone numbers in the incoming restriction list 730 by clicking on the number in the list. The subscriber may add and delete telephone numbers in the incoming restriction list 730, as desired, via the Internet 44 or the IVR 45, as discussed below. Entry 731 of the restricted calling number list 730 is "ALL," which has been selected in the exemplary web page 700, as indicated by highlighting and an asterisk. In response to the selection of entry 731, the call monitoring service blocks all incoming calls to the subscriber telephone 25 during the call blocking period, subject to the parameters set in the "Allow Incoming" section, as discussed below. In an alternative embodiment of the invention, the subscriber is given the option to build a master incoming rejection list that is not subject to the time of day, day of week scheduler. In other words, the subscriber may identify telephone numbers from which calls are always accepted, regardless of the status of the "Block Incoming" and "Allow Incoming" sections of web page 700.

The incoming restriction list 730 includes additional exemplary entries, which are not highlighted in the example of FIG. 7. Entries 732-735 are specific telephone numbers; entry 736 is an area code, only (i.e., the NPA of a ten digit telephone number); and entry 737 is an area code plus a local exchange identifier (i.e., the NXX of a seven digit number). Selection of entries 732-735 results in only those specific numbers being blocked. Selection of entry 736 results in all numbers from area code 808 being blocked. Selection of entry 737 results in all numbers from area code 919 and exchange 333 being blocked.

The subscriber selects telephone numbers from the incoming priority list 740, which will be permitted to connect regardless of whether the call blocking feature is active. Telephone number entries 742 and 745 have been selected, as indicated by highlighting and asterisks, according to the example depicted in FIG. 7. Therefore, during the same time period in which the "Block Incoming" section of the web page 700 is active, calls from telephone numbers 742 and 745 will still be permitted to connect, even though calls from all other telephone numbers are blocked. Telephone numbers 742 and 745 may be, for example, the telephone numbers of the subscriber's children's school and the subscriber's work place, calls from which have been deemed by the subscriber as too important to block. In an alternative embodiment of the invention, the subscriber is given the option to build a master incoming priority list that is not subject to the time of day, day of week scheduler. In other words, the subscriber may identify telephone numbers from which calls are always accepted, regardless of the status of the "Block Incoming" and "Allow Incoming" sections of web page 700.

The incoming priority list 740 also includes entry 741, "ALL," which effectively overrides the incoming restriction list 730. In an embodiment of the invention, selection of entry 741 overrides the call blocking of incoming restriction list, except for when specific telephone numbers have been highlighted in the incoming restriction list. Entries 743 and 744 of the incoming priority list 740 are specific telephone numbers; entry 746 is an area code; and entry 747 is an area code plus a local exchange identifier. As in the case of the incoming restriction list 730, the remaining entries of the incoming priority list 740 allow connection of calls from the telephone numbers, the area code or the area code plus exchange when entries 743/744, 746 and 747 have been selected, respectively. Note that web page 700 has no effect on the ability of the subscriber to bypass any incoming call blocking using the subscriber blocking override PIN.

Figure 8:
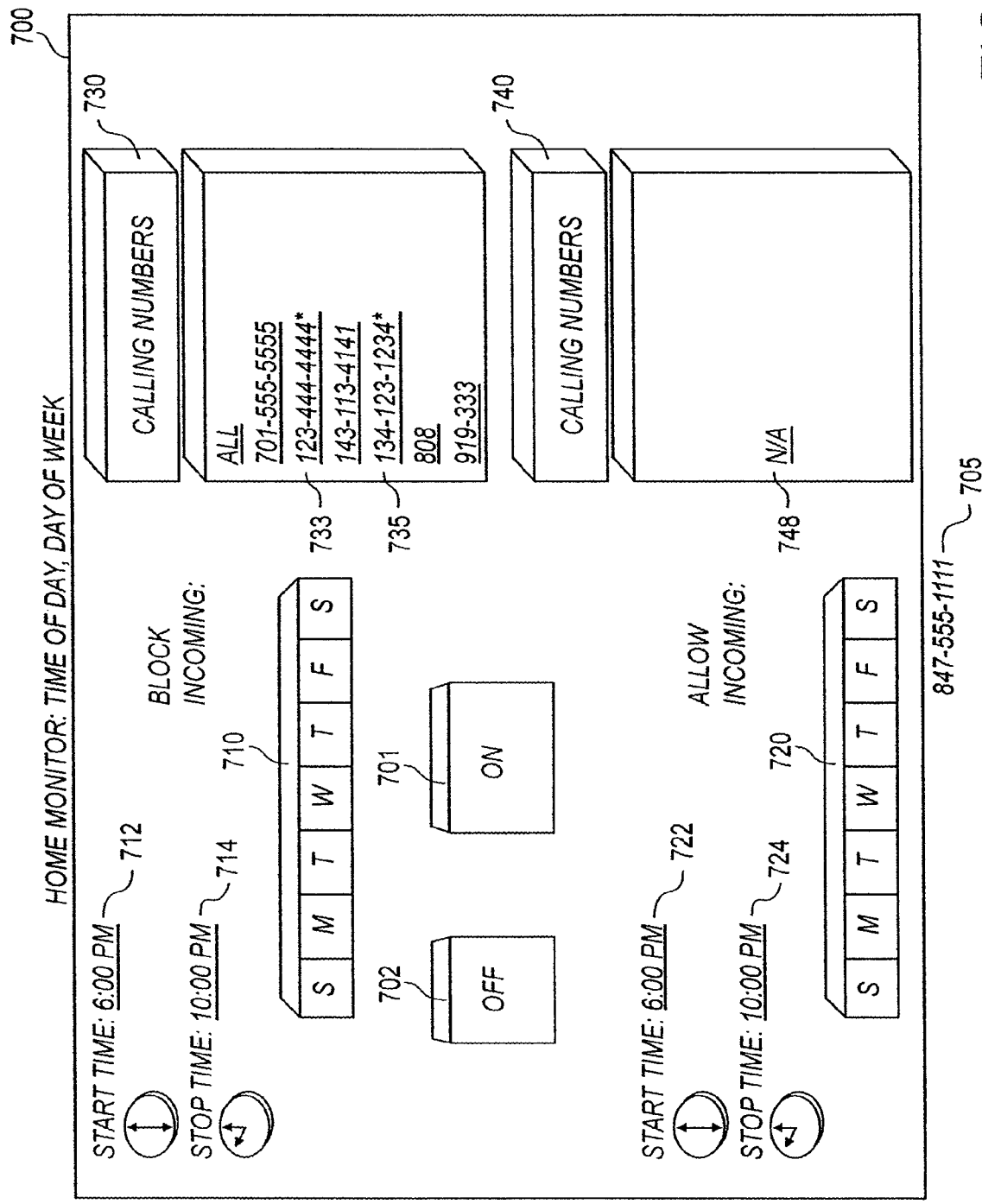
FIG. 8 is an exemplary web page to be displayed at the subscriber's PC showing a scheduler for incoming call blocking on weekends, according to an aspect of the present invention.

FIG. 8 likewise depicts exemplary web page 700, which is displayed at GUI 32 after the subscriber has been successfully authenticated. FIG. 8, however, indicates the call blocking parameters for Saturday and Sunday, as indicated by the highlighting of S and S in the day of the week fields 710 and 720. The start time and the stop time for the call blocking feature on both days is 6:00 a.m. and 10:00 a.m., respectively. During that time period, calls are blocked from telephone numbers 733 and 735 of the incoming restriction list 730. The selected numbers are highlighted and marked by asterisks.

The start time field 722, the stop time field 724 and the day of the week field 720 indicate that the "Allow Incoming" section of web page 700 is active during the same time period on Saturday and Sunday. However, the incoming priority list 740 has an single entry 748, "N/A," meaning "not applicable." In the depicted embodiment of the invention, whenever the subscriber selects only specific telephone numbers to be blocked (e.g., entries 733 and 735) pursuant to the incoming restriction list 730, the incoming priority list 740 automatically displays "N/A" because all other incoming calls are allowed.

Figure 9:
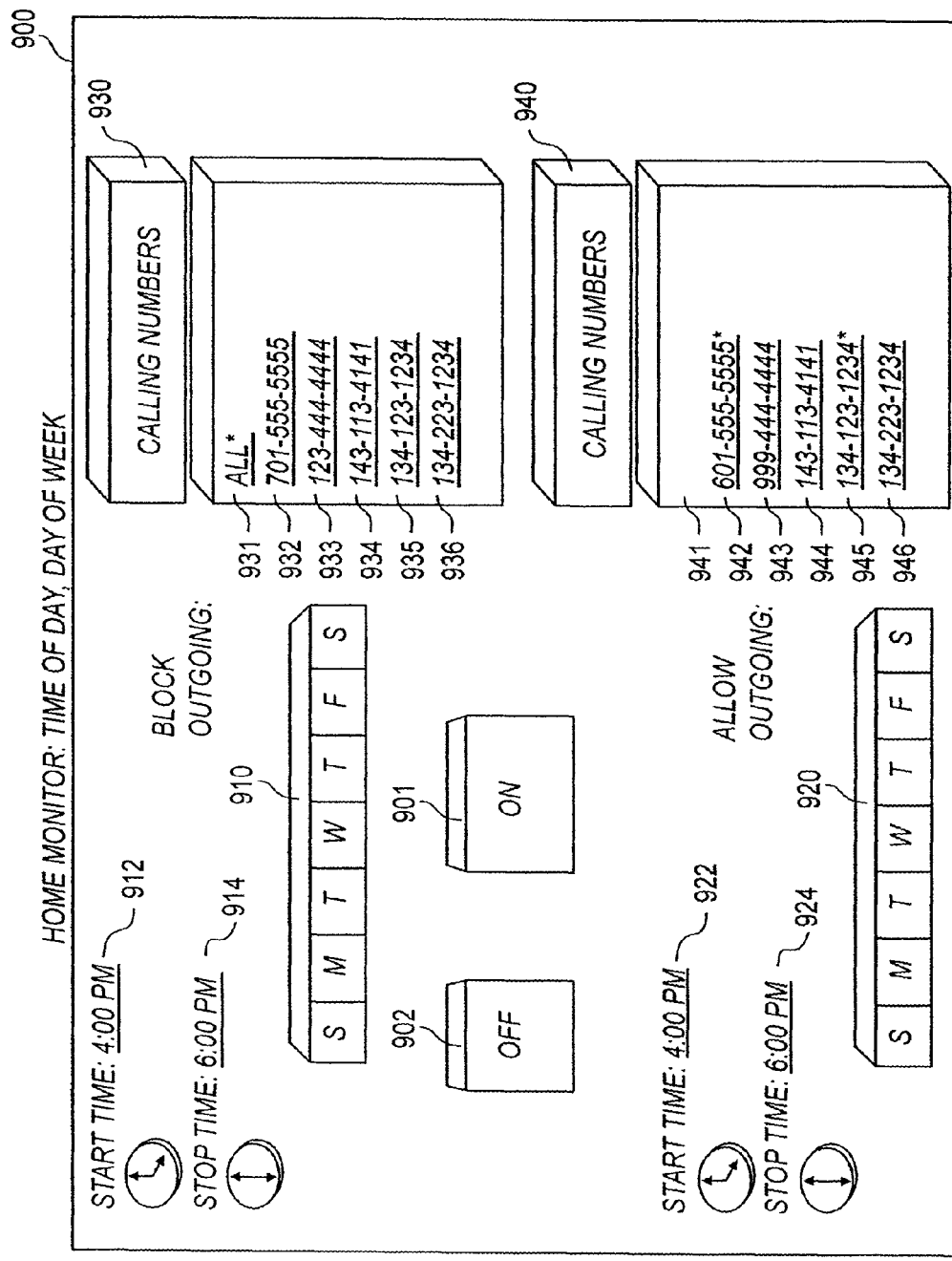
FIG. 9 is an exemplary web page to be displayed at the subscriber's PC showing a scheduler for outgoing call blocking during weekdays, according to an aspect of the present invention.

FIG. 9 is an exemplary web page 900 displayed at GUI 32 after the subscriber has been successfully authenticated, as described with respect to steps 610-620 of FIG. 6. The web page 900 is a typical layout enabling the subscriber to schedule the call blocking feature for outgoing calls from the subscriber telephone 25. The telephone number 705 displayed at the bottom of the screen is the same subscriber telephone number to which the call monitoring service corresponds.

The outgoing call blocking feature of the call monitoring service can be turned ON and OFF using buttons 901 and 902, respectively. FIG. 9 indicates the outgoing call blocking feature is ON and therefore active. In an embodiment of the invention, the outgoing call blocking feature of the service is implemented separately from the scheduler. In other words, the subscriber may identify telephone numbers (or groups of telephone numbers) to which outgoing calls are always permitted whenever the call monitoring service itself is activated. Furthermore, certain telephone numbers are always permitted inherently, including emergency numbers, such as 911, and select non-emergency numbers, such as 311.

The web page 900 indicates two sections related to outgoing calls: the "Block Outgoing" section, which is active with respect to the calling numbers list 930 from the start time 912 to the stop time 914, and the "Allow Outgoing" section, which is active with respect to the calling numbers list 940 from the start time 922 to the stop time 924. The calling numbers lists 930 and 940 correlate to the outgoing restriction list and the outgoing priority list, described with respect to FIG. 4, above.

According to the example shown in FIG. 9, the "Block Outgoing" section is active from 4:00 p.m. to 6:00 p.m., as indicated by the start time field 912 and the stop time field 914, respectively. The active period occurs each day, Monday through Friday, as indicated by the highlighting of the M, T, W, T, F in the day field 910. The "Allow Outgoing" section is likewise active from 4:00 p.m. to 6:00 p.m., as indicated by the start time field 922 and the stop time field 924, respectively. The active period occurs each day, Monday through Friday, as indicated by the highlighting of the M, T, W, T, F in the day field 920. The time period for blocking outgoing calls usually matches the time period for allowing outgoing calls. Therefore, in an embodiment of the invention, the web page 900 includes an option for the subscriber to simply select "same" (not pictured) with respect to the time period for allowing outgoing calls. In the example depicted in FIG. 9, the subscriber has instructed the blocking feature of the call monitoring service to block certain outgoing calls, each weekday, from 4:00 p.m. through 6:00 p.m. For example, that time may be designated for children in the household to focus on homework assignments.

The subscriber selects the telephone numbers in the outgoing restriction list 930 by clicking on a number in the list. The subscriber may add and delete telephone numbers in the outgoing restriction list 930, as desired, via the Internet 44 or the IVR 45, as discussed below. Entry 931 of the outgoing restriction list 930 is "ALL," which has been selected in the exemplary web page 900, as indicated by highlighting and an asterisk. In response to the selection of entry 931, the call monitoring service blocks all outgoing calls from the subscriber telephone 25 during the call blocking period, subject to the parameters set in the "Allow Outgoing" section, discussed below.

The outgoing restriction list 930 includes additional exemplary entries, which are not highlighted in the example of FIG. 9. Entries 932-936 are specific telephone numbers. Selection of any one of entries 932-936 results in calls to the corresponding telephone numbers being blocked. The outgoing restriction list 930 may also include entries of an area code and/or an area code plus a local exchange identifier (not pictured). Selection of an area code, only, would result in all numbers to that area code being blocked. In an alternative embodiment of the invention, the subscriber is given the option to build a master outgoing restriction list that is not subject to the time of day, day of week scheduler. In other words, the subscriber may identify telephone numbers to which calls are never permitted, regardless of whether the outgoing call blocking feature has been activated for other telephone numbers or groups of telephone numbers.

The subscriber selects telephone numbers from the outgoing priority list 940, which will be permitted to connect regardless of whether the call blocking feature is active. Telephone number entries 942 and 945 have been selected, as indicated by highlighting and asterisks, according to the example depicted in FIG. 9. Therefore, during the same time period in which the "Block Outgoing" section of the web page 900 is active, calls to telephone numbers 942 and 945 will still be permitted to connect, even though calls to all other telephone numbers are blocked. Telephone numbers 942 and 945 may be, for example, the telephone numbers of close relatives, deemed by the subscriber as too important to block. In an alternative embodiment of the invention, the subscriber is given the option to build a master outgoing priority list that is not subject to the time of day, day of week scheduler. In other words, the subscriber may identify telephone numbers to which calls are always allowed, regardless of the status of the "Block Outgoing" and "Allow Outgoing" sections of web page 900.

The outgoing priority list 440 also includes entry 941, "ALL," which effectively overrides the outgoing restriction list 930. In an embodiment of the invention, selection of entry 941 overrides the call blocking of the outgoing restriction list, except for those specific telephone numbers that have been highlighted in the outgoing restriction list. Entries 943, 944 and 946 are specific telephone numbers, to which outgoing calls would be permitted if they were selected. The outgoing priority list 940 may also include entries of an area code and/or an area code plus a local exchange identifier (not pictured). Selection of an area code, only, would result in all numbers to that area code being allowed. In an alternative embodiment of the invention, the subscriber is given the option to build a master outgoing priority list that is not subject to the time of day, day of week scheduler. In other words, the subscriber may identify telephone numbers to which calls are always permitted, regardless of the outgoing restriction and priority lists otherwise indicated by the scheduler. Note that web page 900 has no effect on the ability of the subscriber to bypass any outgoing call blocking using the subscriber blocking override PIN.

Figure 10:
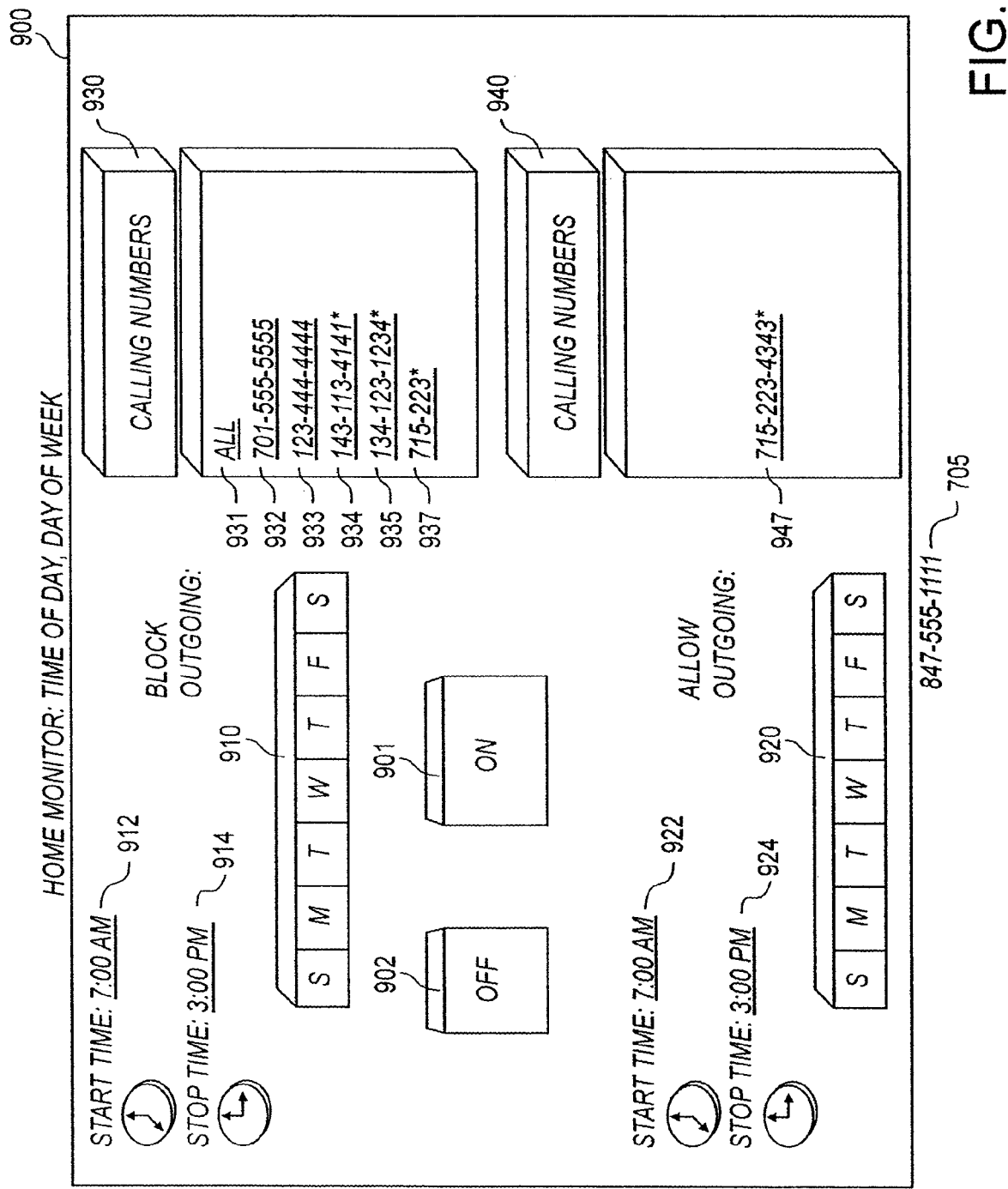
FIG. 10 is an exemplary web page to be displayed at the subscriber's PC showing a scheduler for a single weekday, according to an aspect of the present invention.

FIG. 10 likewise depicts exemplary web page 900, which is displayed at GUI 32 after the subscriber has been successfully authenticated. FIG. 10, however, indicates the outgoing call blocking parameters for Monday, only, as indicated by the highlighting of M in day fields 910 and 920. The start time and the stop time for the call blocking feature for Monday is 7:00 a.m. and 3:00 p.m., respectively. During that time period, calls are blocked to telephone numbers 934 and 935, as well as to the area code plus exchange identifier 937, of the outgoing restriction list 930. The selected numbers are highlighted and marked by asterisks. The selected time period, applicable only one day a week, may be, for example, a time during which a baby sitter watches children at the subscriber's house and the subscriber wants to prevent inappropriate use of the telephone.

The start time field 922, the stop time field 924 and the day of the week field 920 indicate that the "Allow Outgoing" section of web page 900 is active during the same time period on Monday. However, the outgoing priority list 940 has a single entry 947, which is a telephone number. Note that the telephone number 947 has the same area code and exchange identifier as entry 937 of the outgoing restriction list 930. Listing the telephone number 947 in the outgoing priority list 940 is necessary because calls to telephone number entry 947 would otherwise be blocked. In the baby sitter example, the telephone number entry 947 may be the telephone number of a location where the subscriber expects to be during the designated time period. The baby sitter is therefore able to call the subscriber at the listed number, even though it is in the restricted area code and exchange. Otherwise, the subscriber would have to provide the baby sitter the blocking override PIN to override the outgoing call restrictions.

Figure 11:
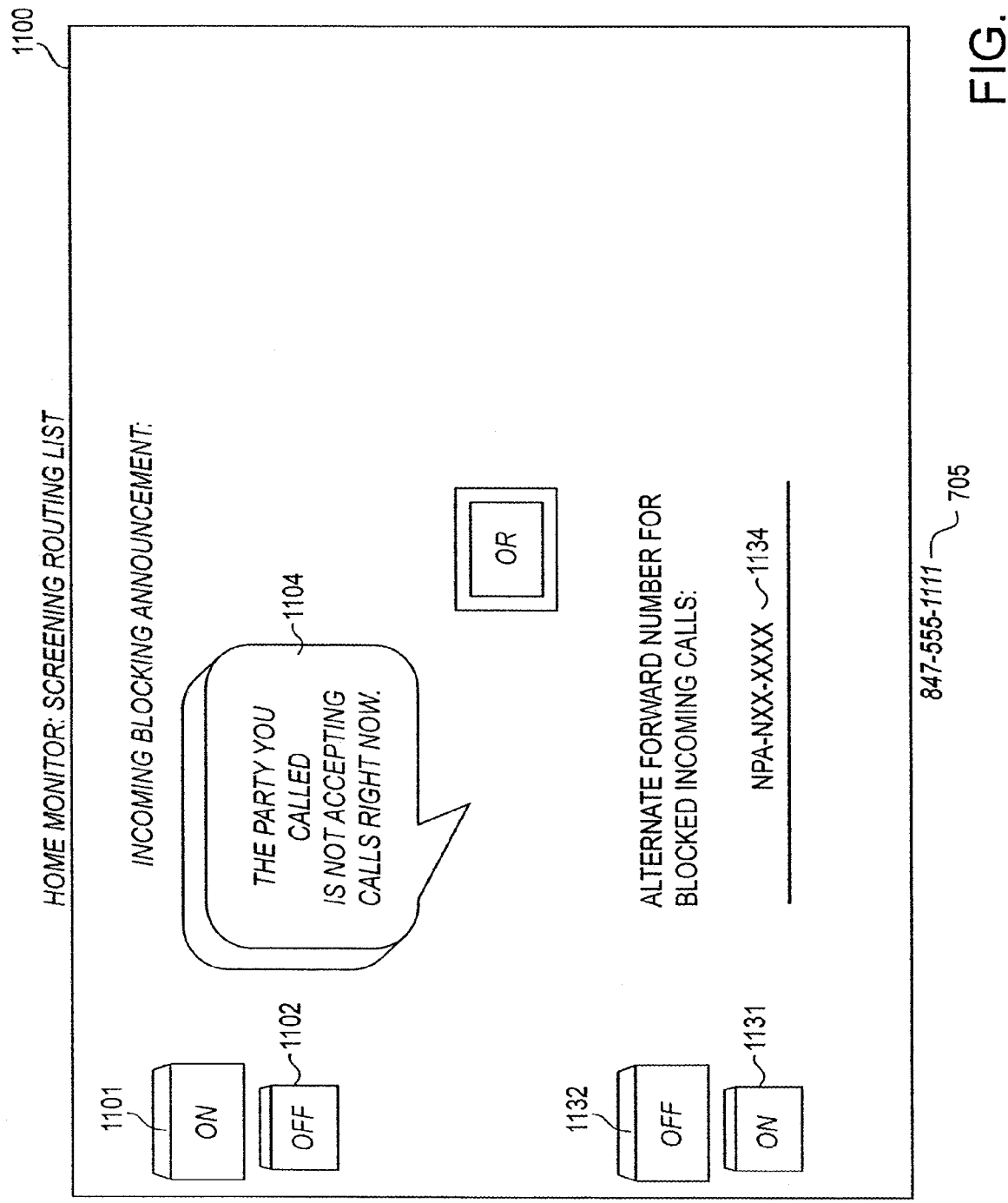
FIG. 11 is an exemplary web page to be displayed at the subscriber's PC showing a screening routing list, according to an aspect of the present invention.

The subscriber is able to further customize the call monitoring service in response to web screens provided over the Internet 44. For example, FIG. 11 depicts a screening routing list web page 1100, which enables the subscriber to determine the automated announcement played in response to an incoming blocked call, as described, for example, with respect to step s224 of FIG. 2. The exemplary options include playing an announcement to the caller and forwarding the call to an alternative telephone number. The incoming blocking announcement is shown at balloon 1104, which is activated and deactivated by the ON button 1101 and the OFF button 1102, respectively. In an alternative embodiment of the invention, the web page 1100 provides the subscriber multiple announcements from which to choose.

The telephone number to which a blocked call is forwarded is shown as forwarding number 1134, indicated by NPA-NXX-XXX. The forwarding number 1134 can be any telephone number, including the telephone number of the subscriber's answering service or a location where the subscriber expects to be during the active call blocking time period. The forwarding option is activated and deactivated by the ON button 1131 and the OFF button 1132, respectively.

FIG. 11 depicts the situation in which the subscriber elects to play the incoming blocking announcement 1104, as indicated by selection of the ON button 1101. The OFF button 1132 has also been selected by the subscriber, so a caller is not given the option to leave a message or have the call forwarded elsewhere. In one embodiment of the invention, the subscriber may select both the ON button 1101 and the ON button 1131. The caller would then hear the designated announcement, but also be presented a choice of calling back or having the call forwarded to the predesignated number 1134.

As indicated above, the call data related to blocked telephone calls, including blocked calls subsequently bypassed by entry of a proper blocking override PIN, is stored at the SCP 23. When the subscriber accesses the SMS 48 via the web server 54 over the Internet 44, the SMS 48 retrieves the stored data from the SCP 23, as indicated in step 622 of FIG. 6, enabling the subscriber to review the call data related to the blocked calls, to delete the call data, to save the call data in alternate databases, to design and populate reports based on the call data, and to display and print the call data reports.

Figure 12:
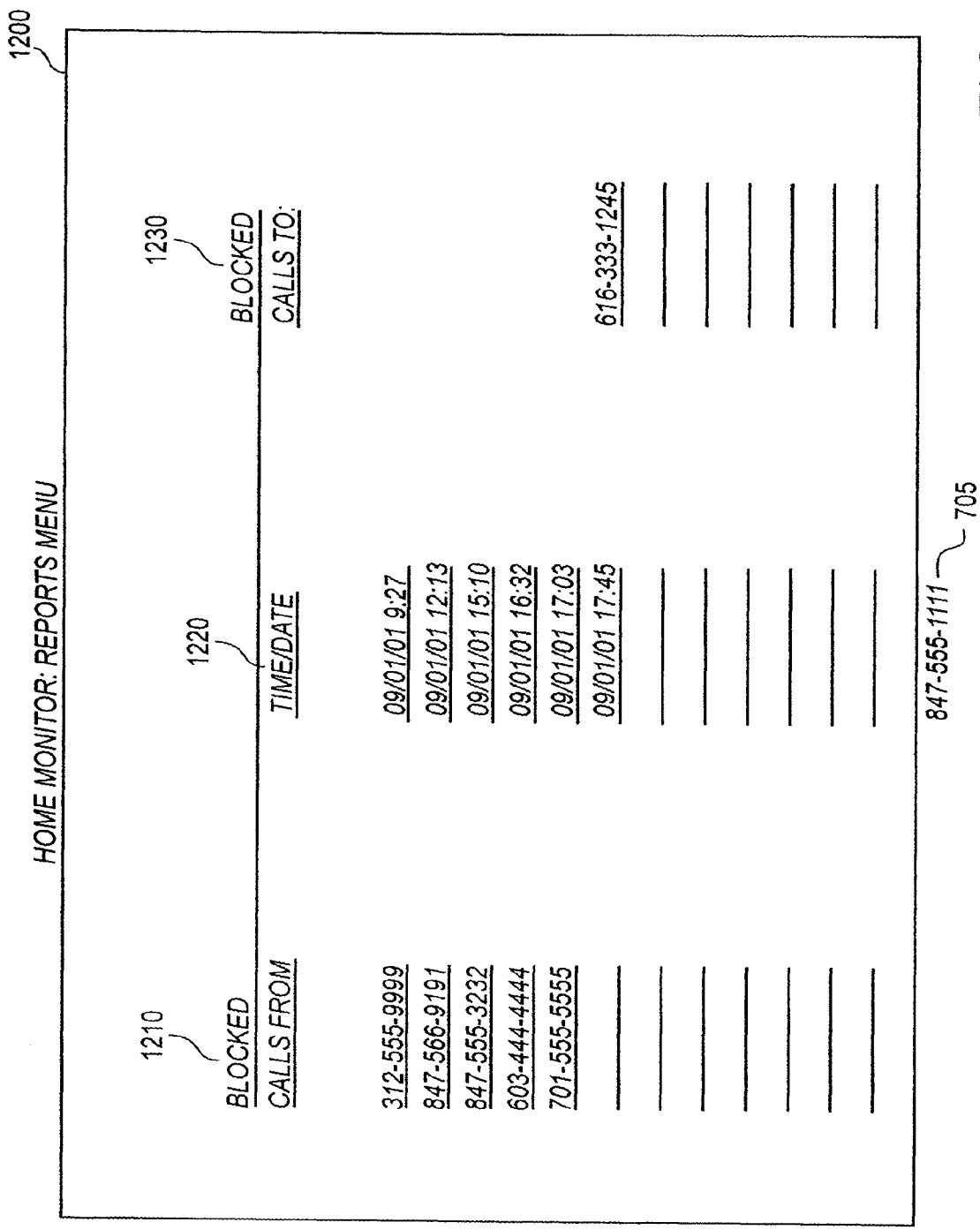
FIG. 12 is an exemplary web page to be displayed at the subscriber's PC showing a calling blocking report, according to an aspect of the present invention.

FIG. 12 is an exemplary web page 1200, displaying a report of blocked call data on a specific date (e.g., Sep. 1, 2001). The report on web page 1200 includes three columns of information. Column 1210 is the incoming blocked calls column, which includes the calling number of each telephone call that was blocked by the incoming call blocking feature of the call monitoring service. Column 1230 is the outgoing blocked calls column, which includes the called number of each telephone call that was blocked by the outgoing call blocking feature. Column 1220 is the Time/Date column, which includes the time and date the calls from both column 1210 and column 1230 were blocked in chronological order. In the example depicted by FIG. 12, the report is limited to Sep. 1, 2001, so the date parameter is the same for every blocked call. However, the subscriber may select a report covering any time period, such as an entire week or month. Furthermore, in an embodiment of the invention, the subscriber is able to create graphical representations, including bar charts and pie charts, summarizing various blocked call reports.

The subscriber is also able to monitor the call blocking activity of the call monitoring service in near real-time at the GUI 32 via the Internet 44. The web client 30 is connected to the SMS 48, via the web server 54, when the incoming and/or outgoing call blocking features of the service are active. The subscriber views a web screen similar to web screen 1200 of FIG. 12 and indicates that real-time updates are desired. In response, the SMS 48 periodically queries the SCP 23 to determine whether additional call data has been stored since the preceding query. The frequency of the queries (e.g., once per minute versus once per 10 minutes) depends in part on the capabilities of the SMS 48 and the SCP 23. In an alternative embodiment of the invention, the SCP 23 updates the SMS 48 automatically at a predetermined rate, regardless of whether the subscriber has specifically requested such updates. The SMS 48 would thus have current call monitoring information and need not query the SCP 23 (e.g., step 622 of FIG. 6) whenever the subscriber logs on to the Internet 44 and requests access to the call monitoring service.

Figure 13:
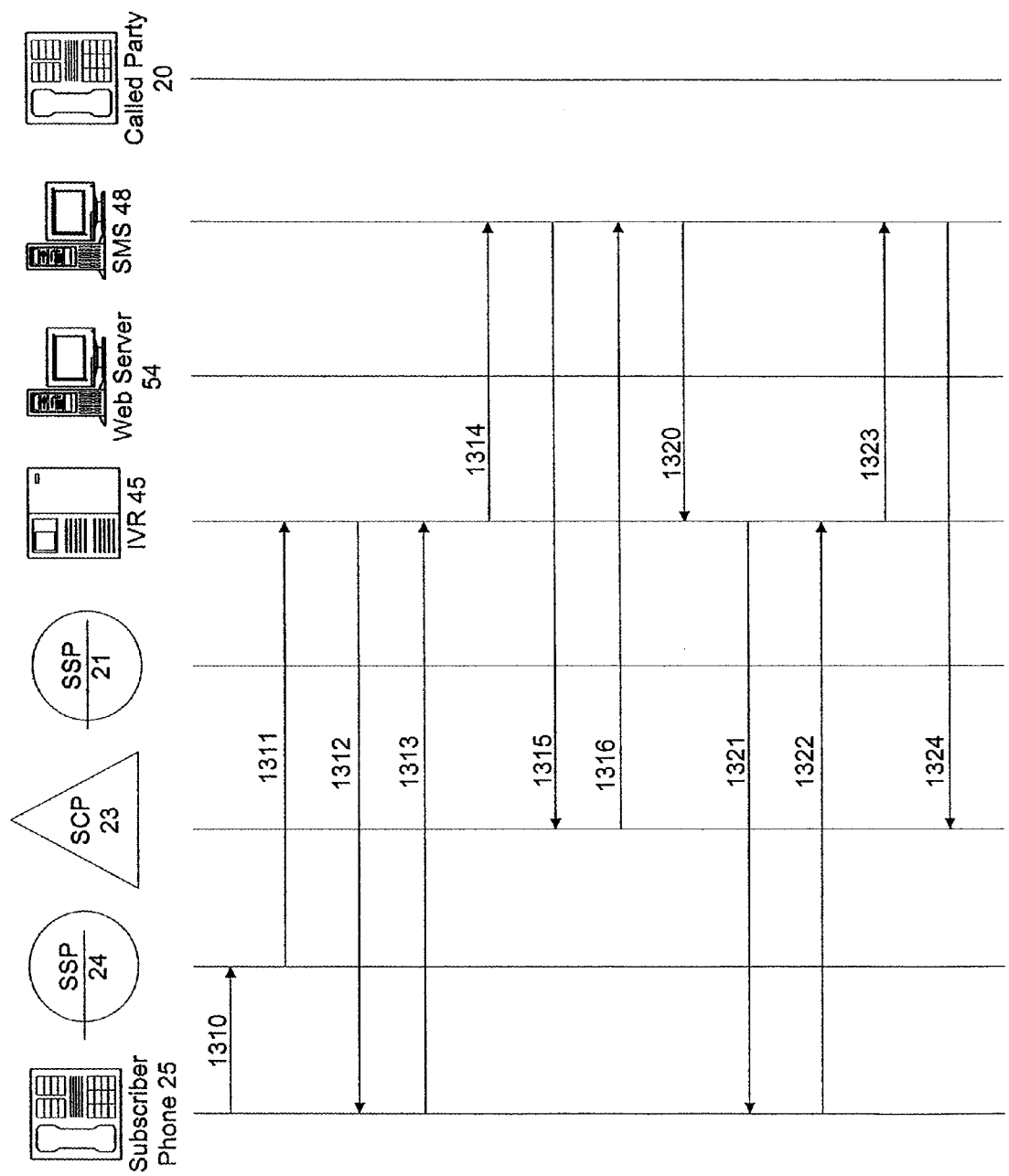
FIG. 13 is an exemplary call flow diagram in which the subscriber accesses the call monitoring service via an interactive voice response system, according to an aspect of the present invention.

All of the information and related iterations available to the subscriber over the Internet 44, described with respect to FIGS. 7-12 are likewise available to the subscriber over the IVR 45. Exemplary steps by which the subscriber interacts with the call monitoring service through the IVR 45 are shown in FIG. 13. Access through the IVR 45 is limited in that the subscriber cannot actually build, edit or view reports or schedules using the IVR 45. However, the subscriber can access all other features of the call monitoring service, including changing the account access PIN, changing the blocking override PIN, toggling the service ON or OFF and activating/deactivating pre-established schedules, restriction lists and priority lists. In an embodiment of the invention, the subscriber also receives a voice generated report of blocked calls, along with the respective dates and times.

Referring to FIG. 13, the subscriber calls a toll free number from the subscriber phone 25, which accesses the IVR 45 via the SSP 24, shown at steps 1310 and 1311. Although FIG. 13 depicts the call originating from the subscriber telephone 25, the subscriber may access the IVR 45 from any DTMF telephone in the PSTN. The IVR 45 receives the call and initiates a request for various authentication information, such as the subscriber account number and a related account access PIN number, at step 1312. (Although communications between the subscriber telephone 25 and the IVR 45 pass through the SSP 24, and possibly additional switches in the PSTN, this step is omitted for convenience.) The account number and the account access PIN, which may be the same as the account number and account access PIN used to access the call monitoring service via the Internet 44, are entered by the subscriber using the touch tones of the subscriber telephone 25 at step 1313. The pre-programmed voice announcements for this aspect of the invention reside in the IVR 45, and implementation of the voice announcements is well known. The IVR 45 forwards the information to the SMS 48 at step 1314 for authentication.

After authentication, the SMS 48 retrieves the current service data for the identified call monitoring service account, including the current schedules and restriction and priority lists, from the SCP 23 at steps 1315 and 1316. The SMS 48 then provides the IVR 45 with the data specific to the subscriber account at step 1320. The IVR 45 verbally recites a menu of options to the subscriber at step 1321 based on the information received from the SMS 48. For example, the subscriber may have previously built a variety of schedules designated "1" for the weekday incoming call schedule (including restricted and priority number lists), "2" for the weekday outgoing call schedule, "3" for the weekend incoming call schedule, "4" for the weekend outgoing call schedule and "5" for the weekday schedule when a baby sitter is at the subscriber's house. The subscriber selectively activates one or more of the schedules, as desired. The information is provided by the subscriber in response to the voice generated options of the IVR 45 at step 1322. The IVR 45 forwards the information to the SMS 45 at step 1323, which updates the subscriber's account at the SCP 23 at step 1324, accordingly. The SCP 23 then handles telephone calls to and from the subscriber telephone 25 according to the updated account information.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed:

1. A method for controlling communications from a first communications address identified by a service user, comprising:

receiving data of a communication to a third party communications address from the first communications address;

determining, by a network controller, whether the first communications address is a restricted address for which the service user has elected to disallow communications, whether the third party communications address is a priority communications address for which the service user has elected to allow communications when the first communications address is the restricted address for which the service user has elected to disallow communications, and whether an identification number received from a party requesting the communication is a personal identification number specified by the service user when the third party communications address is not the priority communications address and the first communications address is the restricted address, disallowing the communication when the identification number is not the personal identification number, the third party communications address is not the priority communications address and the first communications address is the restricted address;

determining whether the third party communications address is an escape address for which the service user does not have an option to disallow communications, and disallowing the communication when the third party communications address is not the escape address, and the identification number is not the personal identification number, the third party communications address is not the priority communications address and the first communications address is the restricted address.

2. The method according to claim 1, further comprising:

allowing the communication when the third party communications address is the escape address without regard to whether the third party communications address is the priority communications address and the first communications address is the restricted address.

3. The method according to claim 1,
wherein the escape address comprises a public emergency address.

4. The computer readable medium according to claim 3, wherein the public emergency address comprises 911.

5. The method according to claim 1, further comprising:
determining whether the third party communications address is the restricted address, and
allowing the communication when the first communications address is not the restricted address and the third party communications address is not the restricted address without regard to whether the third party communications address is the priority communications address.

6. The method according to claim 1,
wherein the first communications address, the third party communications address, the priority communications address and the restricted communications address are all telephone numbers.

7. The method according to claim 1, further comprising:
accepting and storing a plurality of restricted addresses for which the service user has elected to disallow communications.

8. The method according to claim 1,
accepting and storing a plurality of priority communications addresses for which the service user has elected to allow communications when the first communications address is the restricted address for which the service user has elected to disallow communications.

9. The method according to claim 1, further comprising:
requesting the identification number in real time when the third party communications address is not the priority communications address.

10. The method according to claim 9,
wherein the communication is a telephone call, and
wherein, when the identification number is the personal identification number, the telephone call is connected between the third party communications address and the first communications address, and when the identification number is not the personal identification number, the telephone call is terminated.

11. The method according to claim 1, further comprising:
storing the data of the communication in a database accessible by the service user through a packet switched data network.

12. The method according to claim 1, further comprising:
determining whether a time of the communication is within a restricted time period previously identified by the service user,
wherein, when the time of the communication is not within the restricted time period, the communication is allowed without regard to whether the third party communications address is the priority communications address and the first communications address is the restricted address.

13. The method according to claim 1, further comprising:
determining whether a call control schedule is active; and
determining whether the first communications address is a restricted address and whether the third party communications address is a priority communications address only when the restricted call control schedule is active and only in accordance with the restricted call control schedule.

14. The method according to claim 13, further comprising:
when the restricted call control schedule is not active, allowing the communication between the third party communications address and the first communications address without regard to whether the third party communications address is the priority communications address and the first communications address is the restricted address.

15. The method according to claim 13, further comprising:
receiving an instruction to deactivate the active call control schedule via a packet switching network; and
deactivating the active call control schedule in near real time.

16. The method according to claim 1,
wherein the restricted address comprises an area code and the priority communications address comprises a complete number within the area code.

17. A non-transitory computer readable medium that stores a computer program, recorded on the computer readable medium, that, when executed by a processor of a network controller, controls communications from a first communications address identified by a service user, the computer readable medium comprising:
a receiving code segment, recorded on the computer readable medium, that receives data of a communication to a third party communications address from the first communications address;
a determining code segment, recorded on the computer readable medium, that determines whether the first communications address is a restricted address for which the service user has elected to disallow communications, whether the third party communications address is a priority communications address for which the service user has elected to allow communications when the first communications address is the restricted address for which the service user has elected to disallow communications, and whether an identification number received by a party requesting the communication is a personal identification number specified by the service user when the third party communications address is not the priority communications address and the first communications address is the restricted address, and
a first disallowing code segment that disallows the communication when the identification number is not the personal identification number, the third party communications address is not the priority communications address and the first communications address is the restricted address;
a determining code segment that determines whether the third party communications address is an escape address for which the service user does not have an option to disallow communications, and
a second disallowing code segment that disallows the communication when the third party communications address is not the escape address, and the identification number is not the personal identification number, the third party communications address is not the priority communications address and the first communications address is the restricted address.

18. The non-transitory computer readable medium according to claim 17,
wherein the data of the communication is stored and is retrievable in near real time by the service user over a packet switching network.

19. A network controller for controlling communications from a first communications address identified by a service user, comprising:

a receiver that receives data of a communication to a third party communications address from the first communications address;

a determiner that determines whether the first communications address is a restricted address for which the service user has elected to disallow communications, whether the third party communications address is a priority communications address for which the service user has elected to allow communications when the first communications address is the restricted address for which the service user has elected to disallow communications, and whether an identification number received from a party requesting the communication is a personal identification number specified by the service user when the third party communications address is not the priority communications address and the first communications address is the restricted address, and a disallower that disallows the communication when the identification number is not the personal identification number, the third party communications address is not the priority communications address and the first communications address is the restricted address;

wherein the determiner also determines whether the third party communications address is an escape address for which the service user does not have an option to disallow communications, and wherein the disallower disallows the communication when the third party communications address is not the escape address, and the identification number is not the personal identification number, the third party communications address is not the priority communications address and the first communications address is the restricted address.

20. The network controller of claim 19, wherein the network controller comprises a service controller for a telecommunications network.

* * * * *